United States Patent [19]

Gombrich et al.

[11] Patent Number: 4,623,418

[45] Date of Patent: Nov. 18, 1986

[54] ELECTRONIC HAND HELD TAPE LABELER

[75] Inventors: Peter P. Gombrich, Minneapolis; John A. Uttermark, White Bear Lake; Sidney L. Schmid, St. Paul; Denis L. Larson, New Brighton, all of Minn.

[73] Assignee: ADC Telecommunications, Minneapolis, Minn.

[21] Appl. No.: 679,924

[22] Filed: Dec. 10, 1984

[51] Int. Cl.[4] ............................................. G06K 15/22
[52] U.S. Cl. .................................... 156/361; 156/384; 364/519; 364/520
[58] Field of Search ................... 156/384, 350, 361; 364/519, 520

[56] References Cited

U.S. PATENT DOCUMENTS

| 4,026,758 | 5/1977 | Sato | 156/540 |
| 4,111,736 | 9/1978 | Hamisch, Jr. | 156/38 X |
| 4,125,419 | 11/1978 | Hamisch, Jr. | 156/277 |
| 4,264,396 | 4/1981 | Stewart | 156/361 |
| 4,407,692 | 10/1983 | Torbeck | 156/350 |
| 4,435,772 | 3/1984 | Suzuki et al. | 364/520 |
| 4,532,521 | 7/1985 | Onoda et al. | 364/520 X |

OTHER PUBLICATIONS

Thomas & Betts, "E-Z-Coder" ® Printer (single page advertisement).

Primary Examiner—David Simmons
Attorney, Agent, or Firm—Merchant, Gould, Smith, Edell, Welter & Schmidt

[57] ABSTRACT

There is disclosed a hand held labeler apparatus (40) utilizing an X-Y plotter apparatus (71) for printing on label material (60) rotatably supported as a label supply roll (58). The labeler apparatus (40) includes a keyboard (62) for entering label information to be printed on the label, such as alpha/numeric characters and special symbols and operational information for control of the labeler apparatus. Further, a liquid crystal display (66) is provided facing generally toward the user when the labeler apparatus (40) is hand held such that the liquid crystal display (66) is readily observable as the label information is entered at the keyboard (62).

19 Claims, 47 Drawing Figures

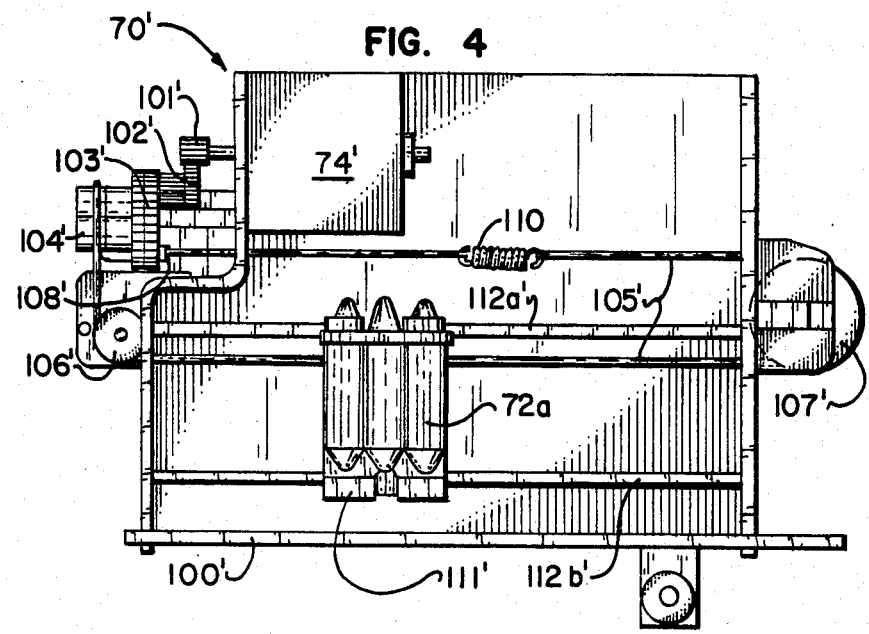
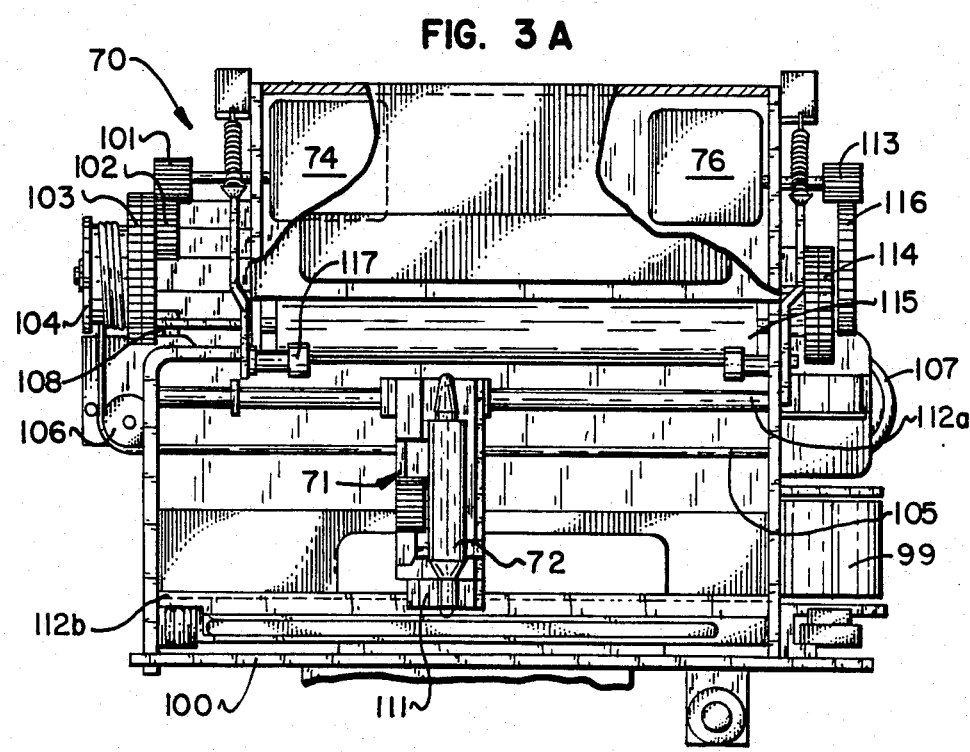

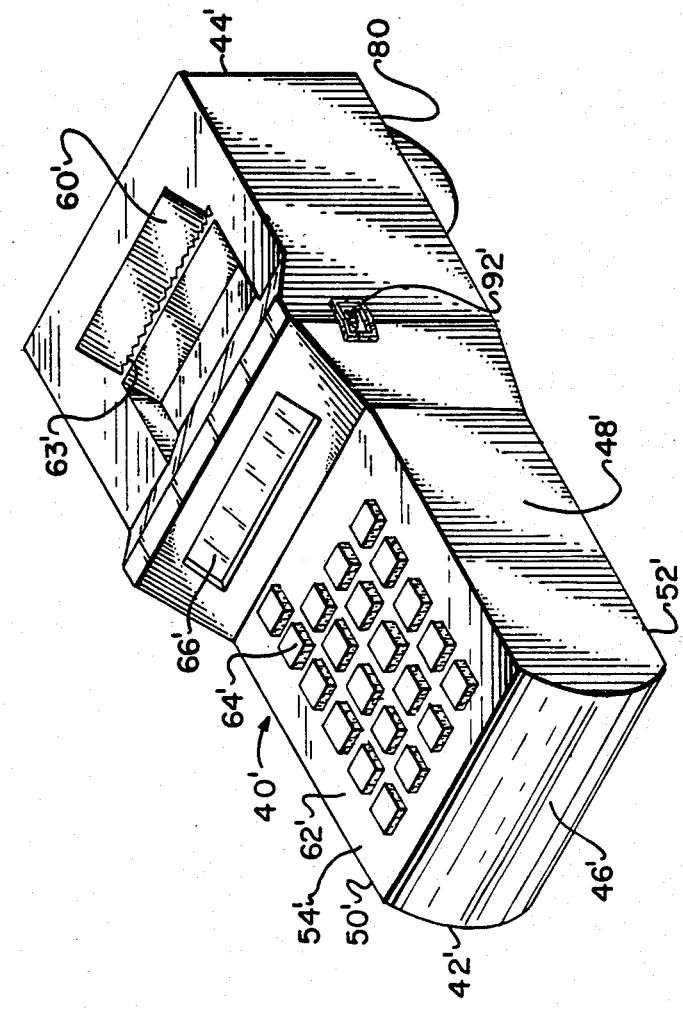

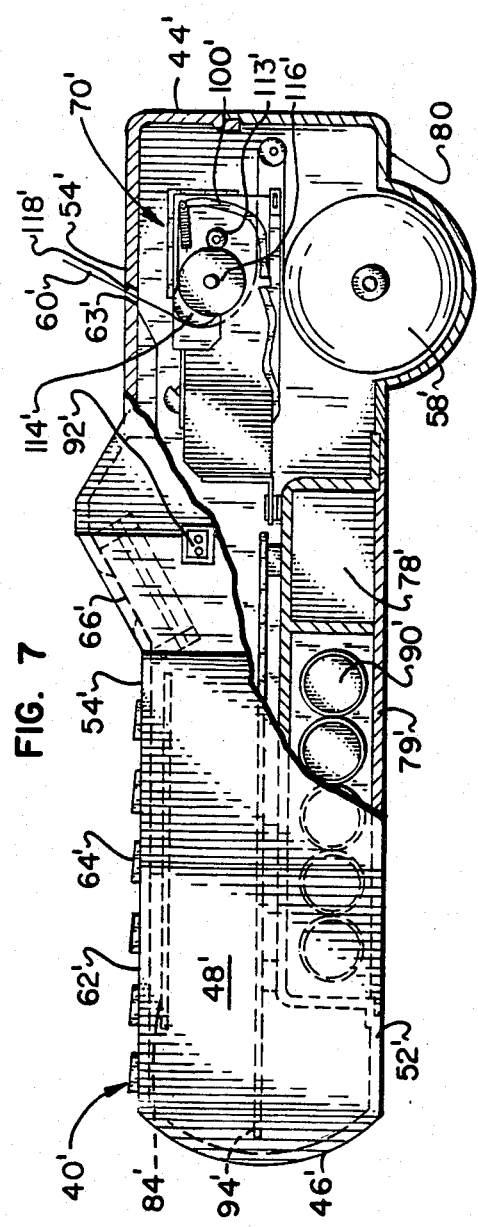

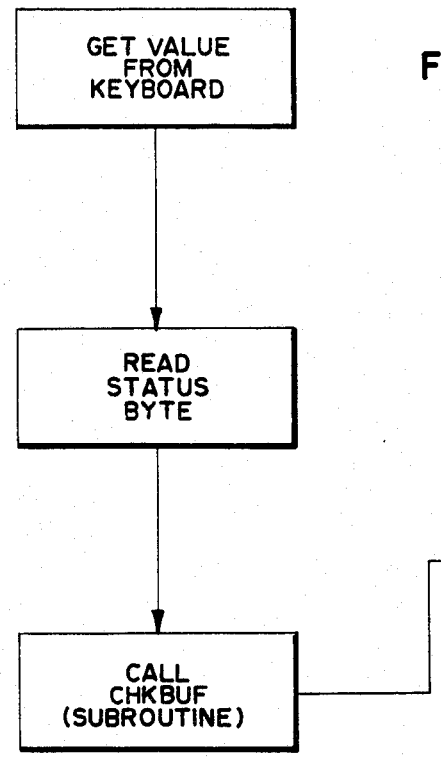
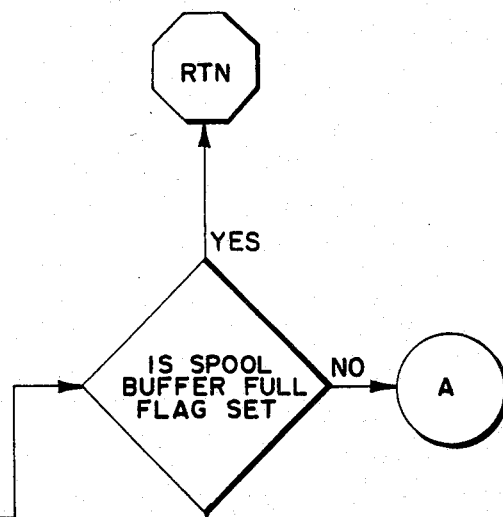
FIG. 10A
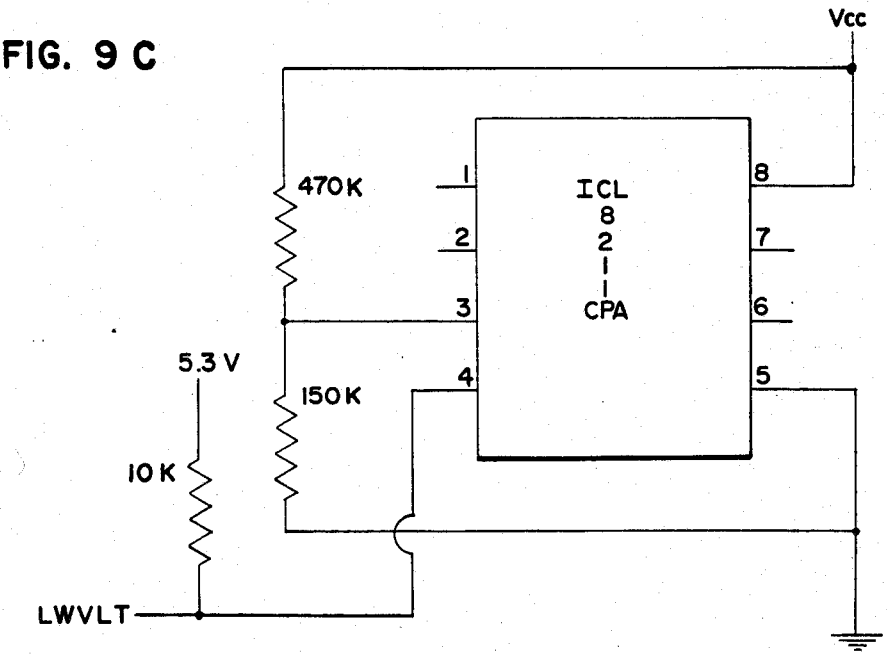
FIG. 9C

FIG. 11D
FIG. 11E
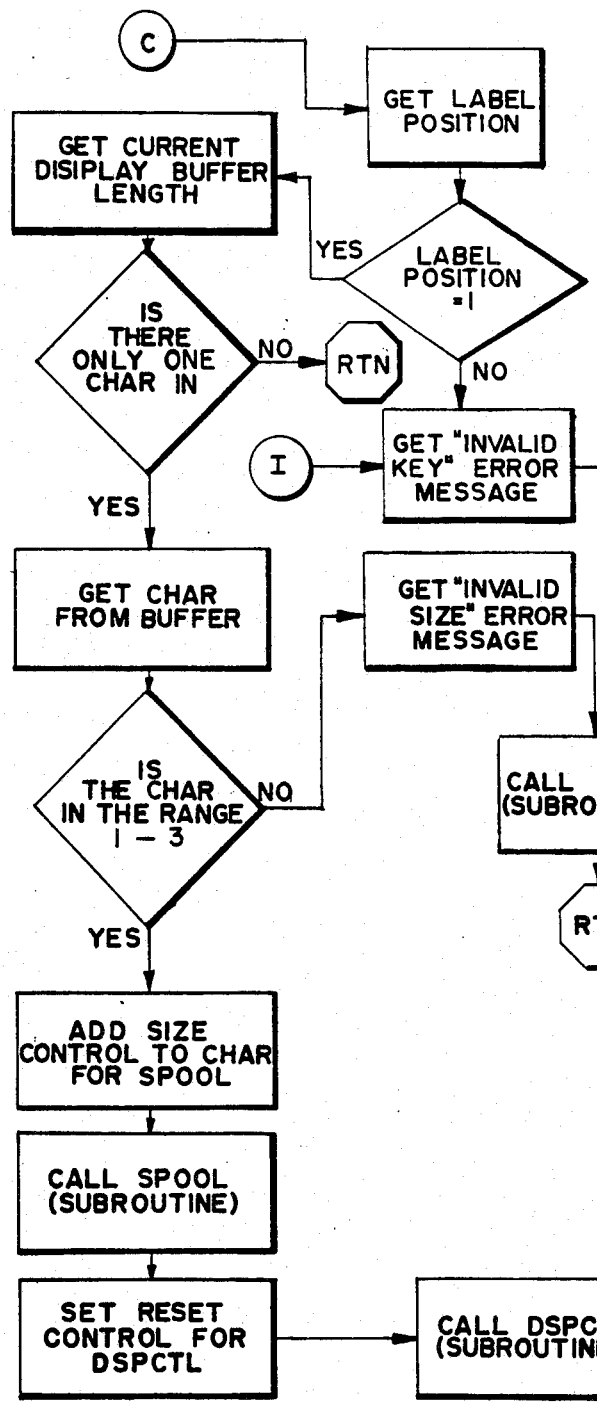
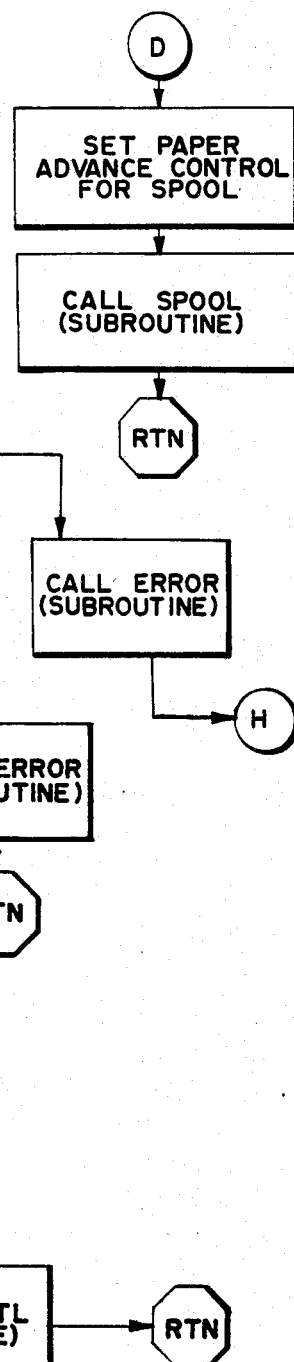

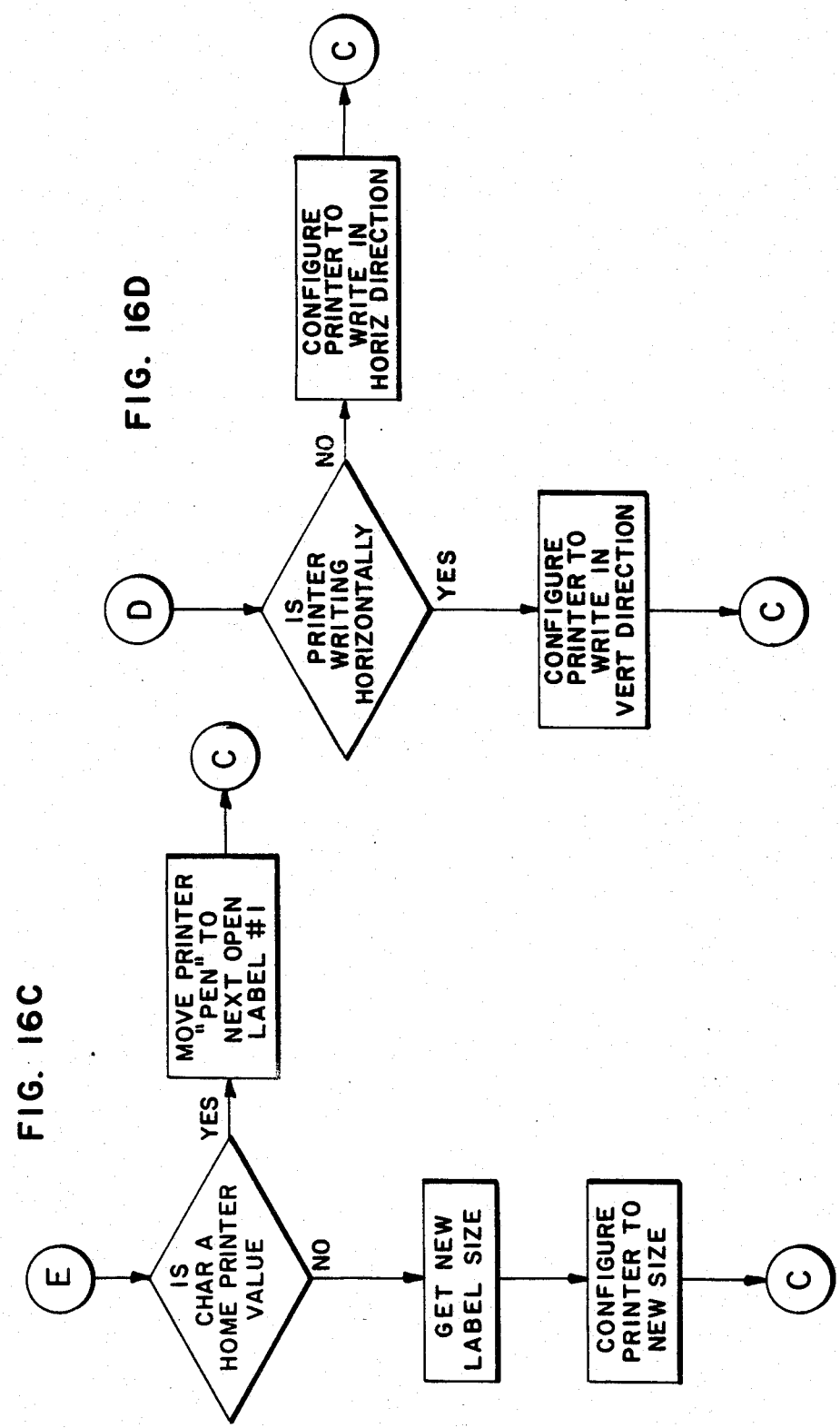

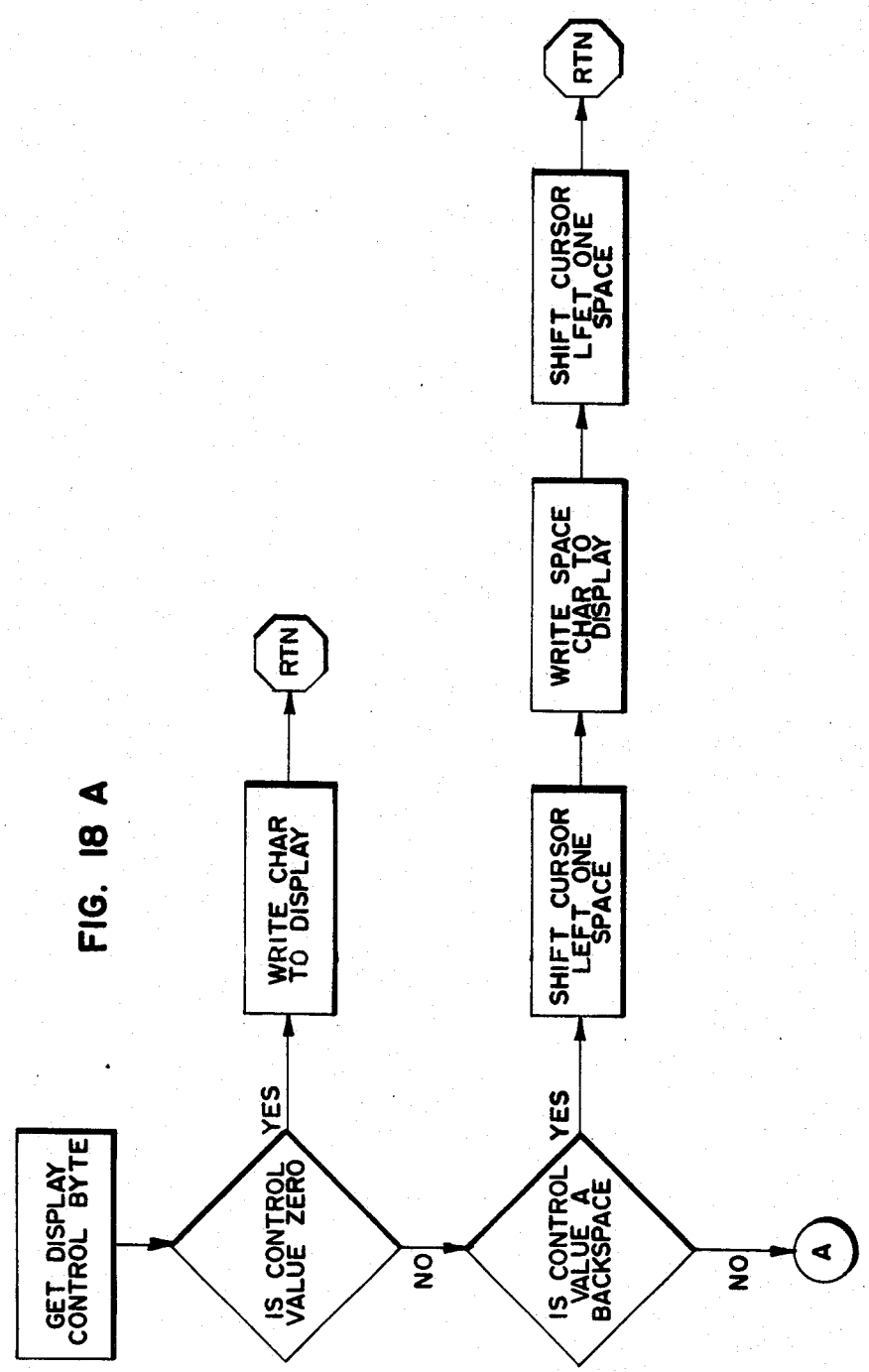

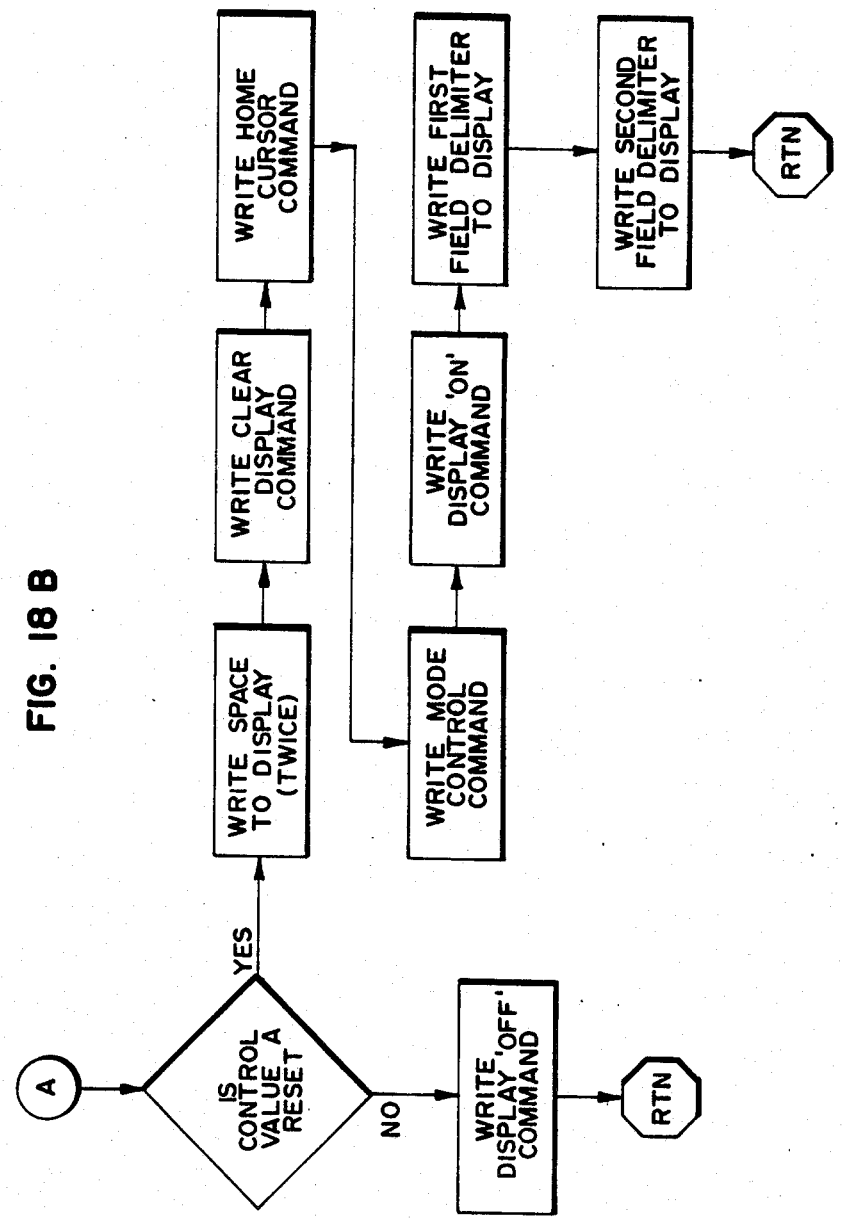

ELECTRONIC HAND HELD TAPE LABELER

BACKGROUND OF THE INVENTION

The present invention relates to labelers. More particularly, the present invention relates to a hand held labeler utilizing an X-Y plotter.

Labeler devices have long been used to make self-adhesive strips of labels with appropriate indicia thereon. The self-adhesive strips of labels are then attached to objects for various purposes such as identification of the objects. However, a typical drawback with existing labelers is their relative bulkiness which limits their portability. Additionally, another problem with currently existing labelers is their severely limited ability to provide labels of various sizes/orientation of characters. Some attempts have been made at developing a hand held labeler as is evident by U.S. Pat. No. 4,407,692. However, this patent exhibits several disadvantages. For example, thermographic printing elements are employed, requiring the use of special thermal paper. In addition, heat dissipation and packaging are a problem. Also, a thermographic printer device cannot change the color of the label print. Further, the display does not appear to be positioned such that the operator can readily observe the entries being made at the keyboard. The power requirements would also appear fairly substantial. In addition to these and many other problems, the hand held labeler disclosed in U.S. Pat. No. 4,407,692 appears relatively complicated and indeed, it is difficult for the applicant to appreciate how the labeler disclosed in U.S. Pat. No. 4,407,692 will even function as disclosed.

The present invention solves these and many other problems related to currently available labelers.

SUMMARY OF THE INVENTION

The present invention relates to a hand held labeler apparatus, including a housing having a front end portion and a back end portion, the housing further having a top portion, side portions and a bottom portion. The bottom portion and side portions are adapted for being engaged by a user's hand. The labeler further includes label support means interconnected to and supported by the housing for supporting a composite web of label material releasably adhered to a backing strip of material, the composite web having a longitudinal axis and a transverse axis. Power supply means is positioned within and supported by the housing for providing the electrical energy required to operate the labeler apparatus. Printing means is supported by the housing for printing on the label material at a printing position. The printing means includes an X-Y plotter apparatus electrically interconnected to the power supply means. The X-Y plotter apparatus includes a marker means for applying indicia on the label material, the indicia being applied at the printing position. The X-Y plotter includes Y-motor means for advancing the composite web in a direction parallel to the longitudinal axis of the composite web and toward the printing position into printing relationship with the printing means, the X-Y plotter further including X-motor means for movement of the marking means across the composite web parallel to the transverse axis thereof. Keyboard means is supported on the top portion of the housing for entering user-selected label information to be printed on the label material by the printing means and for entering operational information for controlling operation of the keyboard means and the printing means. Display means supported by the housing is provided for displaying the selected information to be printed by the printer means. Control processor means is supported by the housing and electrically interconnected to the keyboard means for receiving and processing data representative of the selected label information and operational information entered at the keyboard means. The control processor means is electrically interconnected to the display means for transmitting to the display means data representative of the selected label information to be displayed at the display means. The control processor is further electrically interconnected to the printing means for transmitting to the printing means data representative of the selected label information to be printed on the label material by the printer means. The control processor means is further electrically interconnected to the X-Y plotter for advancing the label material as required for printing.

One particularly advantageous feature of the present invention is its compact nature. The housing which encloses most of the working elements of the labeler apparatus is configured to enable the labeler apparatus to be hand held, thereby providing the labeler apparatus with a high degree of portability.

Yet another advantage of the present invention is use of an X-Y plotter apparatus in conjunction with a programmed microprocessor, thereby enabling varying sizes and varieties of alpha/numeric characters and other symbols to be printed. The X-Y plotter is particularly advantageous in that it enables multiple colors or variable colors to be utilized. Furthermore, specialized paper is not required as is the case with thermographic labelers. Accordingly, varying types of label material can be utilized. Also, the X-Y plotter apparatus is subject to less wear and jarring than a dot-matrix printer device.

Still another advantage of one embodiment of the present invention is the provision for multiple widths of label material on a single roll of backing strip material. In one embodiment of the present invention, the width is designated or selected by user input to the keyboard.

Yet another advantage of the present invention is the provision for varying sizes (lengths) of labels to be selected by the user, the control means processor determining the available label printing area based on the user selected label size.

Still another advantage of the present invention is its capability to print multiple lines of information on a single label.

Further, the drive mechanism of the present invention has slight power requirements as compared to other drive mechanisms and is relatively efficient. In one embodiment of the present invention, the control processor means will adjust the size of the label print depending on the length of the label selected.

Another feature of one embodiment of the present invention is the ability to print information in the form of alpha/numerics and symbols at varying orientations on a label.

Still another advantage of the present invention is the presence of a display means. In one embodiment display means is provided for displaying the information to be printed thereby enabling the user to review the displayed information to make sure it is correct and make any necessary changes and/or modifications before initiating the printing of the label. This is particularly advantageous in that the user can modify the information so displayed prior to printing to make sure of its accuracy.

In one embodiment of the present invention, status characters are displayed on the display means providing general status information of the label apparatus such as entry mode or operating mode.

Yet another feature of one embodiment of the present invention is a provision of the keyboard wherein the entry keys have multiple entry modes such that differing information can be entered from the same entry key depending on the entry mode selected by the user, the keyboard having entry mode selection keys for selecting the required entry mode.

Another feature of one embodiment of the present invention is the provision of a DC power supply and an adaptor for interconnection to an external DC power supply. In one embodiment, the DC power supply can be recharged by and the labeler apparatus operated by interconnecting the labeler apparatus via the adaptor to an eight volt DC plug-in power supply.

In one embodiment of the present invention, the label material is rotatably mounted on a roll on the outside of the labeler apparatus at the front end of the housing. In yet another embodiment, the roll is contained in the housing to prevent the label material from being contaminated or the operation of the labeler apparatus from being interfered with by the operating environment.

Yet another advantageous feature of the present invention is the use of a programmed microprocessor which can be programmed to provide a variety of labeling capabilities, the microprocessor being interconnected to the printer means, the keyboard, and the display means to receive user input from the keyboard and output information responsive to and representative of the keyboard input.

Another feature of one embodiment of the present invention is the provision for sequencing numbers appearing in successive labels without necessitating the operator's entry of each successive number, the operator need only enter the beginning and ending number prior to depressing the sequence (SEQ) key.

The present invention provides a labeler apparatus with substantial flexibility and ease of use. The present invention can be utilized for labeling a wide variety of items of various sizes and configurations and for printing a variety of information on labels of different sizes. For example, the present invention can be utilized to print labels for use on relatively small diameter wire leads as well as large containers, etc.

Further, the present invention has a relatively uncomplicated mechanical structure, with many of the parts such as the plotter apparatus being off-the-shelf items. Accordingly, the present invention is relatively inexpensive and requires little maintenance over its useful life.

These and various other advantages and features of novelty which characterize the invention are pointed out with particularity in the claims annexed hereto and forming a part hereof. However, for a better understanding of the invention, its advantages, and objects attained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views.

FIG. 3A is a top plan view of the X-Y plotter apparatus of the embodiment shown in FIG. 1, portions being broken away;

FIG. 4 is a top plan view of an alternate embodiment of the X-Y plotter apparatus utilizing a plurality of marking apparatus;

FIG. 6 is a perspective view similar to that of FIG. 1 of an alternate embodiment of the present invention wherein the label material is supported internally of the housing;

FIG. 7 is a sectional view of the embodiment shown in FIG. 6 with portions broken away;

FIG. 9C is a schematic of low voltage detection circuitry of the embodiment shown in FIG. 1;

FIGS. 16A-F are logic flow diagrams of the printer control subroutine of the embodiment shown in FIG. 1;

FIGS. 18A-B are logic flow diagrams of the display control subroutine of the embodiment shown in FIG. 1.

DETAILED DESCRIPTION OF THE PREFERRED EMBODIMENT

Figure 1:
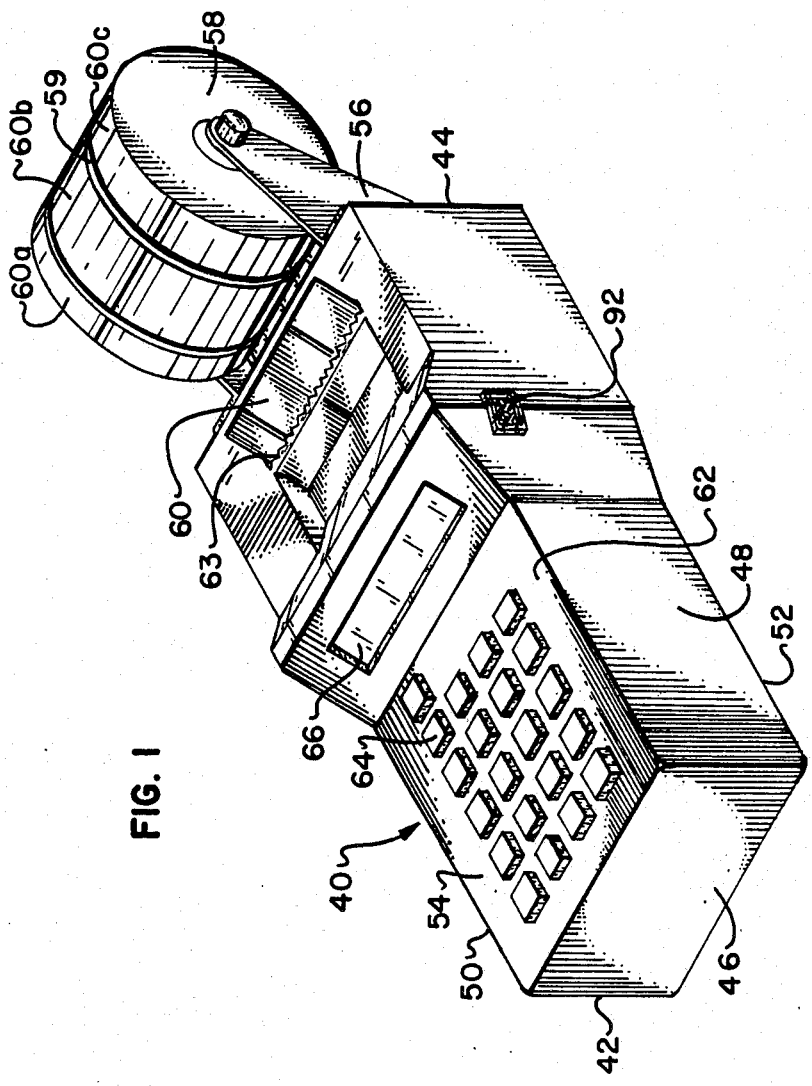
FIG. 1 is a view in perspective of one embodiment of the present invention wherein the label roll is mounted on the outside of the housing.
Figure 2:
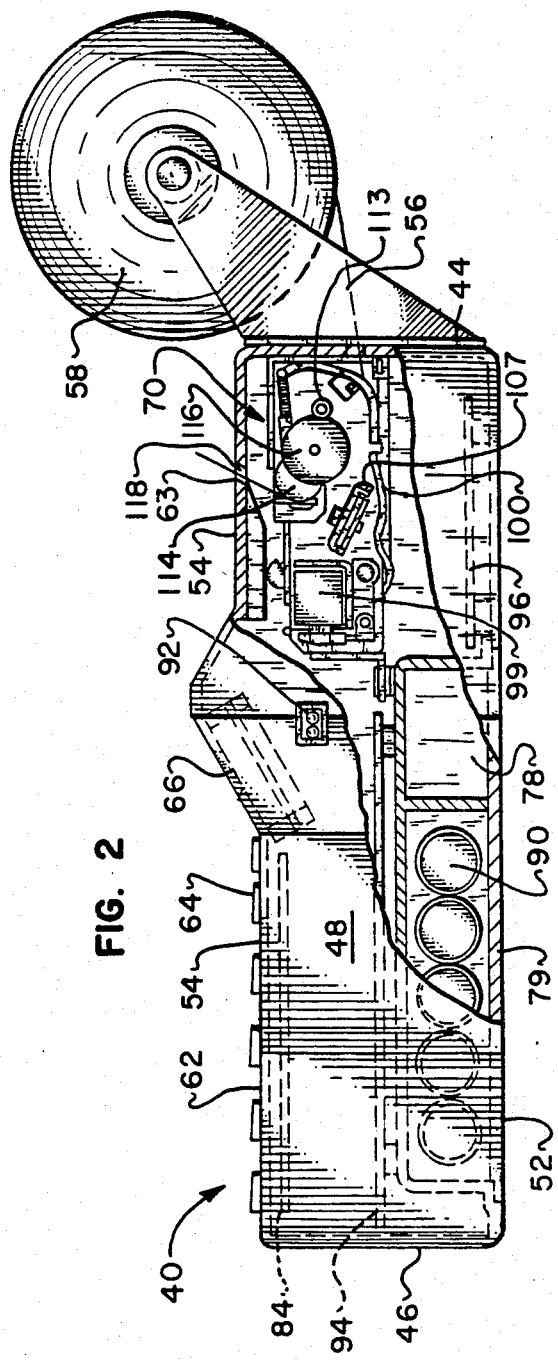
FIG. 2 is a sectional view with portions broken away of the embodiment shown in FIG. 1.

Referring now to the drawings, there is illustrated in FIGS. 1 and 2 a preferred embodiment of the present invention generally being designated by the reference numeral 40. As illustrated, the labeler apparatus 40 of the present invention is a portable, hand held alpha/numeric and symbol labeler apparatus for printing on labels. The labeler apparatus includes a housing 42 adapted to fit in a user's hand and having a front and back end 44, 46, two sides 48, 50, a bottom surface 52 and a top surface 54. Brackets 56 are mounted to the front end 44 of the housing for rotatably supporting a label supply roll 58 comprising a composite web having label material 60 releasably adhered to a backing strip material 59. In the embodiment shown, there are multiple distinct strips of label material 60a, b, c, although it will be appreciated that there may be only a single strip of label material present. Once printed, in the embodiment shown, the lable is separated from the remainder of the supply roll 58 by use of a serrated cutting edge 63 on the labeler apparatus 40 and removed by peeling the label material 60 off the backing material 59. The self-adhesive labels may then be applied to the object for which intended. It will be appreciated that in alternate embodiments, discrete labels having a fixed length and width might be used thereby not requiring cutting of the label material by a serrated cutting edge. Further, different label stocks might be used to provide labels having different lengths and widths.

The labeler apparatus 40 includes a keyboard or keypad 62 disposed on the top surface 54 of the housing 42 including twenty one keys 64 utilized for entering label information to be printed on the labels such as alpha/numerics and special symbols and for entering operational information for controlling operation of the labeler. A sixteen character by one line liquid crystal display (LCD) 66 is provided for viewing the data to be printed on the label material 60. The LCD display is disposed adjacent the keyboard 62 and is shown facing upwardly and rearwardly toward the user and the keyboard 62 so as to be visible during use. As illustrated in FIG. 2, and more particularly in FIGS. 3A–B, the labeler apparatus 40 includes a printing mechanism 70 which utilizes an X-Y plotter apparatus 71 including an ink pen cartridge 72 which is removable from the printing mechanism 70. The printer mechanism 70 is controlled by two stepping motors; one for horizontal movement of the ink pen cartridge or printer head 72, generally referred to as the X-stepper motor and generally designated by numeral 74 in FIG. 3A, and one for the movement of the label material 60, generally referred to as the Y-stepper motor and generally designated by the reference numeral 76 in FIG. 3A. Accordingly, the X-stepper motor 74 controls movement of the printer head across or transversely of the label material 60 while the Y-stepper motor 76 controls movement of the label material 60 in a direction generally along its longitudinal axis. It will be appreciated that many different X-Y plotter apparatus might be utilized. However, the applicant has found that the Alps Electric Co. Model DPG 11 printer by Alps Electric, Inc., 100 North Centre Avenue, Rockville Centre, New York, NY 11570 is adaptable for this application.

As illustrated in FIG. 4, the X-Y plotter apparatus 70 might include a multiple cartridge pen 72a configuration so as to enable use of multiple colors. (In this embodiment parts coresponding to those of FIG. 3A are designated by prime reference numerals.)

As illustrated in FIGS. 6 and 7, in one embodiment of the present invention, the label material 60 might be enclosed within the housing 42' by a removable casing portion 80 disposed in the bottom surface 52' of the housing 42'. (In this embodiment parts corresponding to those of FIGS. 1 and 2 are designated by prime reference numerals.) Also, this embodiment illustrates the use of a single strip of the label material 60'.

As illustrated in FIGS. 8A-E, the labeler apparatus 40 is microprocessor controlled and can be programmed as illustrated in FIGS. 10A through 18B to print various sizes of alpha/numeric characters and special symbols in virtually any configuration of label within the constraints of the label material provided. Also, printing may be horizontal and/or vertical in single or multiple rows depending on program selection. As illustrated in FIG. 2 and more particularly in the schematic of FIG. 9, the labeler apparatus 40 is powered by five nicad batteries 90 and includes an adaptor 92 to enable the labeler apparatus to be powered by a DC plug-in power supply 93. The preferred embodiment can print up to 2,000 characters when operating off the nicad batteries 90, the batteries being rechargeable by plugging in the DC plug-in power supply 93 for a minimum of 12 hours. Ideally, the labeler apparatus 40 may be operated whenever the DC plug-in power supply 93 is interconnected.

As discussed, FIGS. 6 and 7 illustrate an alternate embodiment of the labeler apparatus wherein a roll of label material 58' is rotatably supported inside the labeler housing 42', the labeler housing 42' including the removable casing portion 80 to enable access to the roll of label material 58'. It will be appreciated that although not shown, the removable casing portion 80 might be suitably latched by a suitable latch mechanism or simply snapped into place. The embodiment shown in FIGS. 6 and 7 is particularly advantageous when using the labeler apparatus 40 in a field application wherein the environment for proper operation is less than desirable.

It will be appreciated that the two embodiments illustrated in FIGS. 1 and 6 are but two of the many possible packaging configurations which might be utilized in conjunction with the present invention. Other packaging approaches might enable even further reduction of the overall housing size. For example, using surface mounted electronic components and rubber elastomeric keyboard technology, the size of the labeler housing could be reduced significantly. A removable casing portion 79 in the bottom surface 52 is provided to enable access to a pen storage compartment 78 and replacement of the nicad batteries 90. Once again, the casing 79 might be suitably latched or simply snapped.

Ideally, the electronics will be positioned on a single printed circuit card 94' as is diagramatically illustrated in FIG. 7 although more than one card might be required as is illustrated in FIG. 2 wherein a second printed circuit card 96 is used. The printed circuit card 94 is shown in underlying relationship with respect to the keyboard 62 and the printed circuit card 96 is shown in underlying relationship with respect to the printer mechanism 70. Although not shown, the printed circuit cards 94 and 96 or the individual circuit card 94 are electrically interconnected by suitable electrical connectors such as flexible, ribbon connectors, to other electrical elements of the labeler apparatus.

More particularly, the liquid crystal display (LCD) 66 includes a single line, sixteen character display with capability to display alpha/numeric characters and special symbols. Characters are formed by a 5×7 dot matrix format. Up to fourteen character positions are reserved for displaying characters to be printed. The remaining two positions are reserved for status of the labeler apparatus 40 such as current operating mode. It will be appreciated that other display technologies might be utilized in this application such as light-emitting diodes (LED's) or vacuum fluorescent, however, the liquid crystal display (LCD) provides probably the lowest power consumption.

Plotting characters and symbols is accomplished by electronically stepping the X and Y stepper motors 74, 76 in the appropriate direction depending on a character/symbol algorithm generated by a programmed control microprocessor. The ink pen cartridge 72 is moved on and off the label material 60 by a solenoid 99 actuated mechanism under control of the microprocessor. The ink pen cartridge 72 is provided with a plottable area on the label material 60 which in the preferred embodiment shown is defined as 48 millimeter (mm), or 240 steps, along the transverse axis of the label material 60 which has a width of 58 mm and programmable as desired along the longitudinal axis of the label material 60. It will be appreciated that the plottable area may vary depending on the width of the label material 60 being used. Accordingly, any character/symbol may be generated in this manner according to an alpha/numeric character and symbol algorithm stored in the microprocessor memory. Each step length is 0.2 mm for both the X and Y-stepper motors 74, 76. The stepper motors in the embodiment illustrated have a rate of 260 steps per second. Either one or both of the stepper motors might be activated during the stepping process. The smallest character/symbol that can be printed is 1.05 mm wide×1.45 mm high. The largest character/symbol that can be printed is 48 mm wide×200 mm high. A character/symbol may be printed having any multiple dimension of the 0.2 mm step resolution according to the program stored in the control microprocessor memory. In the embodiment shown, the printing speed of the printer mechanism is 12 characters per second.

As illustrated in FIG. 3A, the X-Y plotter apparatus 71 is mounted in the housing 42 in a suitable support framework 100. In addition to the X-stepper motor 74, the transverse direction drive mechanism includes among other cooperating parts an idler gear 101 interconnected to the X-stepper motor 74. The idler gear 101 is in turn interconnected to a reduction gear 102 which is further interconnected to a bobbin gear 103. The bobbin gear 103 is interconnected to an enlarged cylindrical bobbin 104 for the winding and unwinding thereon of a wire member 105. The wire member 105 is interconnected at one end to the bobbin 104 and extends around a pulley 106 and transversely across the X-Y plotter apparatus 71 whereupon it again extends about a pulley 107 transversely back across the X-Y plotter apparatus 71 where it is fixedly secured at a location 108. As illustrated in FIG. 4, the wire member 105 might include a coil spring 110 or similar type of tensioning device. The cartridge pen 72 is mounted on a slider carriage 111 which in turn is attached to the wire member 105. Further, the slider carriage is slideably mounted on two spaced apart transversely extending shafts 112a,b sliding movement therealong as the wire 105 is wound and unwound onto the bobbin 104 in response to the X-stepper motor 74 being activated. The longitudinal drive mechanism, in addition to the Y-stepper motor 76, includes an idler gear 113 interconnected to the Y-stepper motor 76. The idler gear 113 is in turn interconnected to a gear 114 of a transversely extending rubber roller unit 115 by a reduction gear 116. Preferably, the reduction ratio between the Y-stepper motor 76 and the rubber roller gear 114 is 1:7.86. One pulse of the Y-stepper motor 76 will move the rubber roller or label material 60 by 0.2 mm in the longitudinal or Y direction. Spring biased rollers 117 positioned proximate each end of the rubber roller unit are utilized to hold the label material against the rubber roller unit 115 as the label material is rolled thereacross and through an aperture 118 in the housing 42. It will be appreciated that the support framework 100 may be secured in any suitable manner to the housing 42. It will be apparent to one skilled in the art and familiar with commercially available plotter apparatus how the various parts cooperate. Further, numerous other X-Y plotter apparatus and configurations might be utilized in keeping within the principles of the present invention.

Figure 3B:
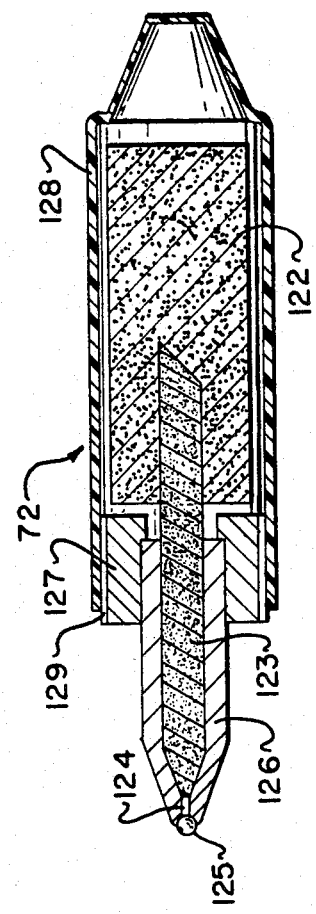
FIG. 3B is an enlarged sectional view of a marking apparatus of the X-Y plotter apparatus shown in FIG. 3A.

Illustrated in FIG. 3B is an embodiment of the cartridge pen 72 which is utilized in one embodiment of the present invention. The cartridge pen 72 contains aqueous ink held by an inner cotton medium 122. The ink is moved through an intermediate core 123 and capillary tube 124 in the pen tip by capillary action. While a super hard ball 125 at the end of the pen rotates in contact with the paper, the ink on the ball is transferred to the label material. As illustrated, the capillary tube and intermediate core are formed by a pen tip 126 suitably mounted in a mouthpiece portion 127. The cotton 122 and mouthpiece 127 are generally enclosed within a hardened case 128 which includes vents 129 at the front end thereof.

Figure 5:
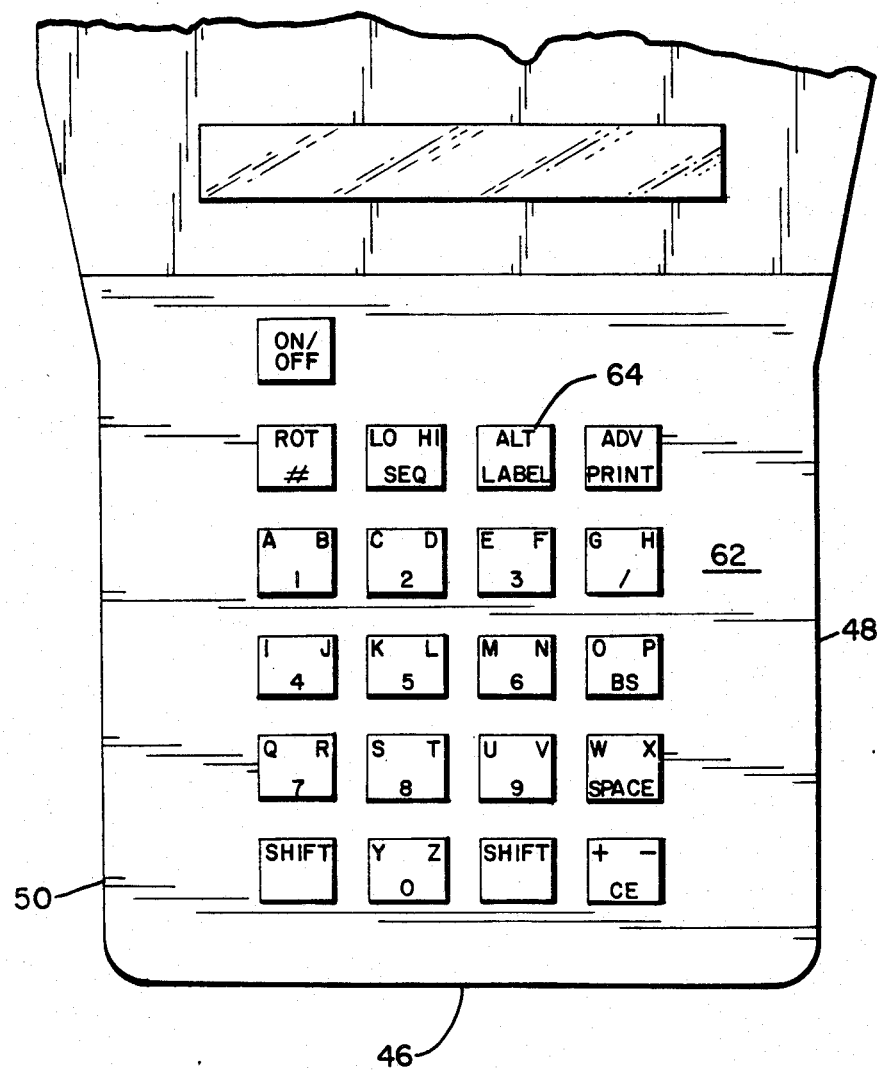
FIG. 5 is a top plan view of the keyboard of the embodiment shown in FIG. 1.

As illustrated in FIG. 5 a twenty one key keyboard 62 is used in entering printing commands and character data to be printed on the label material 60. Since more than twenty one alpha/numerics and commands are required for key entry, in the embodiment shown, multiple keystrokes are required to select alpha data and special functions. One position; two position and three position keys are used for key entry. Two one position keys having indicia SHIFT thereon enable selection of character data and functions as indicated by indicia on the top or upper portion of the remaining keys 64. In the preferred embodiment, one of the SHIFT keys will be blue and the other red. The blue SHIFT key selects the upper position function of the two position keys and the upper left function of the three position keys, while the red SHIFT key selects the upper right function of the three position keys. Depressing the blue or red SHIFT key and then the appropriate key 64 enters the representative code into the display as indicated by the indicia in the upper left or upper right, respectively. The lower position functions of the two and three position keys are activated by directly pressing the keys. The indicia representing the lower position functions will preferably be in black so as to indicate the primary key function while the upper position functions of the two position keys and the upper left position functions of the three position keys will be represented by blue indicia to indicate use with the blue SHIFT key and the upper right position function of the three position keys will be represented by red indicia to indicate use with the red SHIFT key. Thus any key lettering in black is a primary entry and any key lettering in red or blue is a secondary entry and can be activated by pressing the corresponding red or blue SHIFT key followed by the desired key. It will be appreciated that the keyboard shown is only one example of a possible configuration. Other configurations are possible, including those which provide for foreign language entry, and other functions such as a graphics mode, printing logos, etc. As illustrated in FIG. 2 a keyboard substrate 84 is positioned beneath the keys 64 of the keyboard 62.

The following characters can be printed by the embodiment of the labeler apparatus shown:

| A | K | U | 4 |
| B | L | V | 5 |
| C | M | W | 6 |
| D | N | X | 7 |
| E | O | Y | 8 |
| F | P | Z | 9 |

-continued

| | | | |
|---|---|---|---|
| G | Q | 0 | / |
| H | R | 1 | — |
| I | S | 2 | + |
| J | T | 3 | Sp |

The following is a listing of the respective individual key functions:

| KEY | FUNCTION |
|---|---|
| ON/OFF | Turns Labeler ON and OFF and vice versa. Also provides a reset to the default conditions programmed in ROM. |
| ROT # | Rotate (ROT) enables characters previously entered into the display to be rotated 90 degrees and printed on the label. A vertical line appearing on the LCD to the left of the character string indicates that the character string will be rotated when it is printed. A greater than symbol ">" appearing on the LCD to the left of the character string indicates that the character string will not be rotated when printed. To cancel the rotation of the character string, the ROT key is pressed a second time. # sets the number of labels to be printed upon a "PRINT" command or during a "SEQ" function. This command provides for multiple labels to be printed with the contents of the LCD. The default value is 1. The number of labels printed can be changed by entering the appropriate number and pressing the # key. |
| LO HI SEQ | LO - enters the lower value character string for the sequence function. The character string can consist of both alpha and numeric characters as long as the alpha is a prefix. The default value is 0. HI - enters the higher value character string for the sequence function. The character string can consist of both alpha and numeric characters as long as the alpha is a prefix. The default value is 0. SEQ - enables the Labeler to automatically print labels sequentially from the character string entered by the "LO" key. Alpha characters are printed as entered and are not incremented. Once a sequence is completed, the LO and HI values will default to 0. The CE key can cancel a sequence function. |
| ALT LABEL | ALT - displays the contents of the alternate (or second) row. The Labeler can print two rows at a time. Each row can be viewed on the LCD by alternately pressing the "ALT" key. The LCD also contains the row number that is being displayed in the leftmost position followed by a vertical line indicating rotation or a greater than symbol indicating non-rotation. The contents of both rows will be printed when depressing the "PRINT" key. If the contents of the second row is not to be printed, it must be displayed and cleared. A row can be cleared by pressing the CE key. The Labeler will not print a null character string. |

The contents of each row will be printed generally as follows with the alpha/numerics vertically aligned although as previously discussed the rows can be rotated 90 degrees:

```
xx...........x
xx...........x
```

LABEL - enables entry of label code number. This sets up the Labeler printing format to correspond with the label stock being used. This key will set the following:
(1) The number of characters printed per line sized to the label stock.
(2) The distance between labels that the Labeler must advance.
(3) Whether 1 or 2 lines of printing are allowed.
(4) The correct position of the character string on the label.
(5) The number of labels between advance.

| | |
|---|---|
| ADV PRINT | ADV - causes the Labeler to advance the label stock to a preset distance of 1 mm. PRINT - causes the Labeler to print the character string that is displayed in the LCD. The Labeler will also advance the label stock upon completing a row of labels. Printing will always begin with the leftmost label and move in the right hand direction. The character string will be printed left hand justified on the label. Whenever the LCD is cleared, depressing this key will cause the printer to "home". |
| A B 1 | A,B - enters alpha A,B into the display with SHIFT keys. 1 - enters numeric 1 into display. |
| C D 2 | C,D - enters alpha C,D into the display with SHIFT keys. 2 - enters numeric 2 into display. |
| E F 3 | E,F - enters alpha E,F into the display with SHIFT keys. 3 - enters numeric 3 into display. |
| G H / | G,H - enters alpha G,H into the display with SHIFT keys. / - enters slash into display. |
| I J 4 | I,J - enters alpha I,J into the display with SHIFT keys. 4 - enters numeric 4 into display. |
| K L 5 | K,L - enters alpha K,L into the display with SHIFT keys. 5 - enters numeric 5 into display. |
| M N 6 | M,N - enters alpha M,N into the display with SHIFT keys. 6 - enters the numeric 6 into display. |
| O P BS | O,P - enters alpha O,P into the display with SHIFT keys. BS - causes the previously entered character to be erased in the display. |
| Q R 7 | Q,R - enters alpha Q,R into the display with SHIFT keys. 7 - enters the numeric 7 into display. |
| S T 8 | S,T - enters alpha S,T into the display with SHIFT keys. 8 - enters numeric 8 into display. |
| U V 9 | U,V - enters alpha U,V into the display with SHIFT keys. 9 - enters numeric 9 into display. |
| W X SPACE | W,X - enters alpha W,X into the display with SHIFT keys. SPACE - enters a blank into the display. |
| SHIFT | SHIFT (Blue) - enables entry of characters and functions identified in Blue. |
| Y Z 0 | Y,Z - enters alpha Y,Z into the display with SHIFT keys. 0 - enters the numeric 0 into display. |

-continued

| | |
|---|---|
| SHIFT | SHIFT (Red) - enables entry of characters and functions identified in Red. |
| +, −<br>CE | +,− - enters the characters +,− into the display with SHIFT keys.<br>CE clears the contents of the display. |

In operation, the unit is turned on by depressing the ON/OFF key. After three minutes, the unit will shut itself off when no entries are made. When turned back on, the labeler will initialize to the default conditions. Normally, the labeler apparatus 40 will be in numeric entry mode such that key entries made without depressing first one of the SHIFT keys will result in a numeric entry or a function as designated on the bottom portion of the keys 64. To select a label size, the operator will enter a code number as it relates to the size of the label desired, the control processor of the labeler apparatus including a table of values correlating the entered code number to a specific label length. The code number for each label size or length is predetermined and might be found on the bottom surface 52 of the labeler along with complete instructions for operation. The control processor of the labeler apparatus will derive not only the label length from the code entry but also the maximum size of lettering that can be printed in accordance with that size label. After entering the number representative of the desired label size, the user presses the LABEL key. When the LABEL key is depressed, the control processor recognizes the code number as being representative of the desired label size.

Typically, alpha/numeric characters and symbpls for up to 14 positions can be entered by depressing appropriate ones of the keys 64 on the keyboard 62. The characters and symbols to be printed are displayed on the LCD display 66. Upon verifying the accuracy of the data, the user presses the PRINT key and the labeler apparatus 40 automatically advances the label material 60 according to the pre-selected size or length specified by the user. It will be appreciated that once in operation the user need not keep entering the label size. However, when at the first label position, the user can modify the label size by making an appropriate code number and LABEL key entry. If a second line of data is to be entered prior to pressing the PRINT key, the ALT key is pressed, whereupon a second row of characters and symbols can be entered and are displayed on the LCD display 66. The user may alternately view each row of data by depressing the ALT key. When the PRINT key is depressed, two rows of up to 14 characters each will be printed with row one on the top and row two on the bottom as generally indicated below:

XXXXXXXXXXXXXX (Row #1)

XXXXXXXXXXXXXX (Row #2)

The labeler apparatus 40 may be utilized as a sequential number printing device, the first number is entered followed by the LO key and then the last number in the sequence followed by the HI key. The SEQ key is then pressed and the sequence of labels is printed.

Alpha/numeric characters previously entered and displayed at the LCD display 66 can be printed 90 degrees from the normal printed line which is transverse to the longitudinal axis by pressing the ROT key and then the PRINT key. The ROT key causes alpha/numeric characters previously entered and displayed to be rotated 90 degrees when printed on the label material 60. The labeler apparatus 40 will automatically size the number of characters entered to the size of the label previously programmed into the control processor by the user. Restrictions on the number of characters versus size of the label might be indicated by instructions on the back side of the labeler apparatus 40.

As previously indicated, entry of alpha characters is provided by the SHIFT key along with the appropriate key bearing the indicia for the desired alpha. Each of the alpha keys has two alpha characters designated on the upper portion of the key. Depressing the blue SHIFT key and the desired alpha key enters the upper leftmost alpha character into the display. Depressing the red SHIFT key and the same alpha key enters the rightmost alpha character into the display.

FIGS. 8A–E illustrate the schematic of the labeler apparatus 40 electronics. The labeler apparatus 40 is largely controlled via two microprocessors, one microprocessor (80C50) generally designated by the reference numeral 150, controls the application program or user interface while the other microprocessor (DLG 11), generally designated by the reference numeral 152, controls the printer mechanism.

In the schematic diagrams illustrated in FIGS. 8A–E, most of the connections to the various integrated circuits are designated by three different designations; the pin number of the integrated circuit package, the integrated circuit manufacturer's mneumonic designation, and an interconnection designation which defines the interconnections between the various integrated circuits. In FIGS. 8A–E, the pin number designations are shown above each lead to each integrated circuit, and are positioned just outside of the blocks that represent each of the integrated circuits. The manufacturer's mneumonics are placed adjacent to the pin numbers inside the various blocks representing the various integrated circuits and serve generally to identify the various functions performed. The interconnection designations are placed outside the various blocks defining the various integrated circuits at the end of the interconnection lines. The interconnection designations are also mneumonic in form and if the same interconnection designation is present on leads extending from two or more different integrated circuits, it indicates that those leads are interconnected.

Figure 8A:
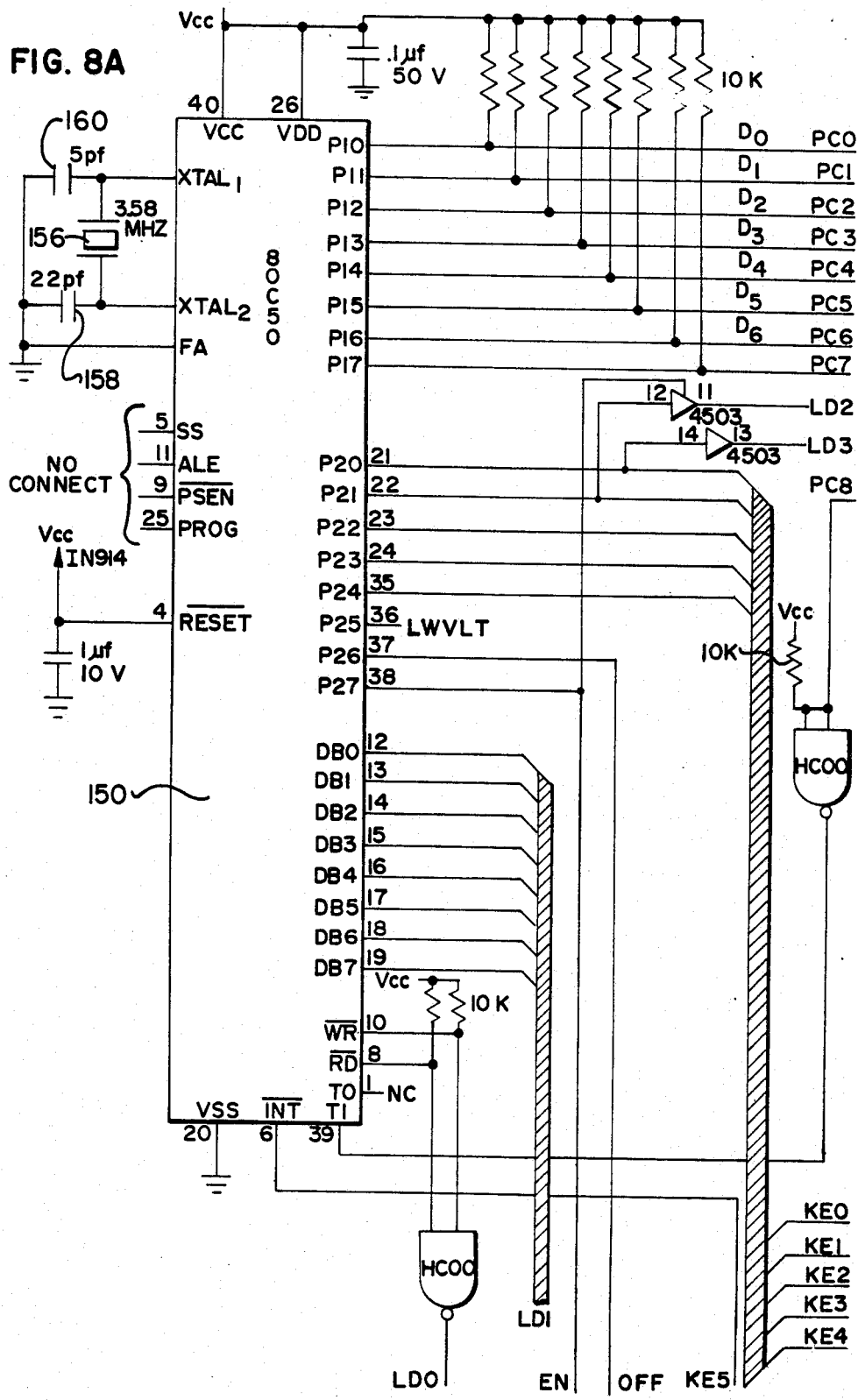
FIGS. 8A-E are schematic views of the electronics of the embodiment shown in FIG. 1.
Figure 8B:
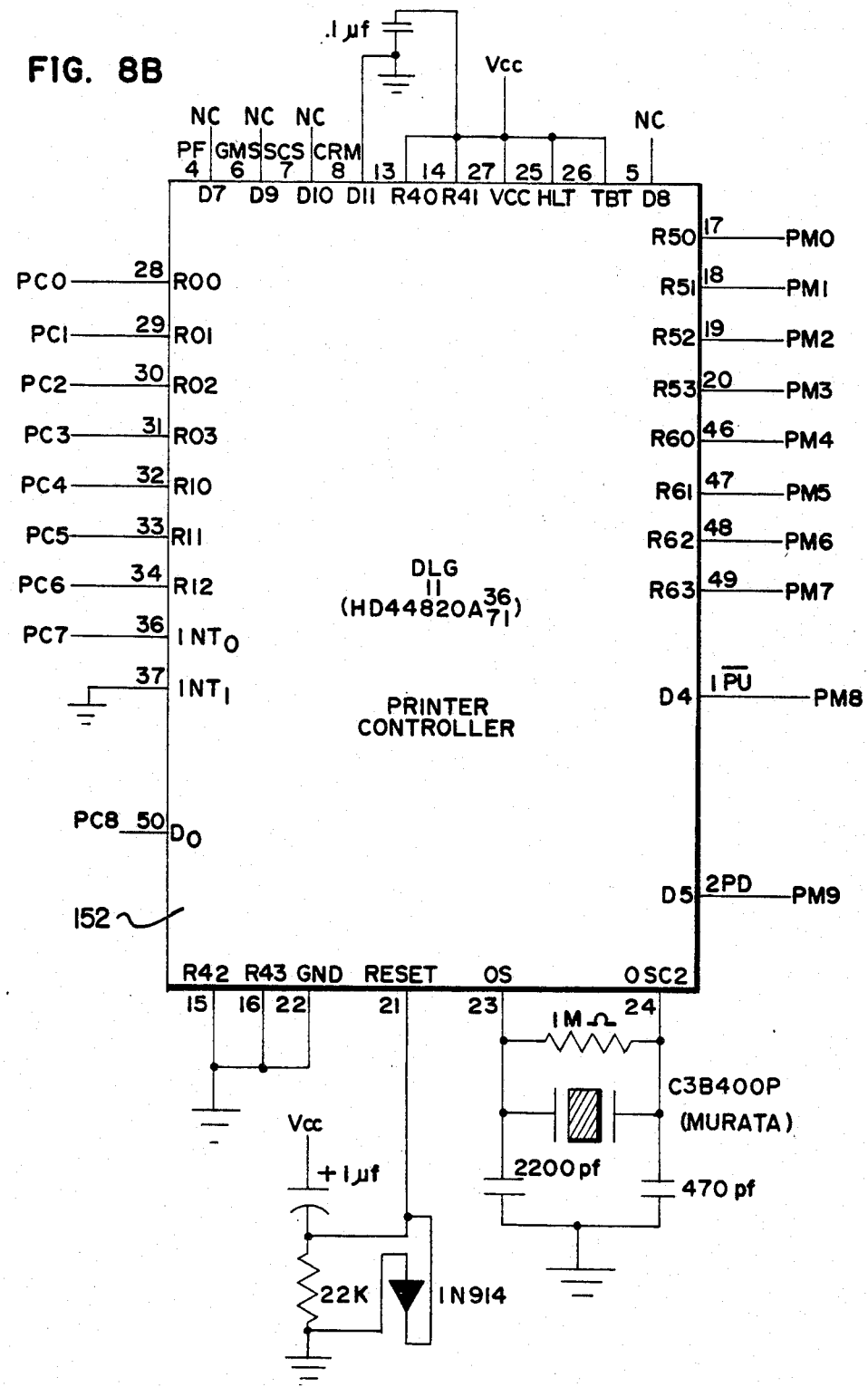
Figure 8C:
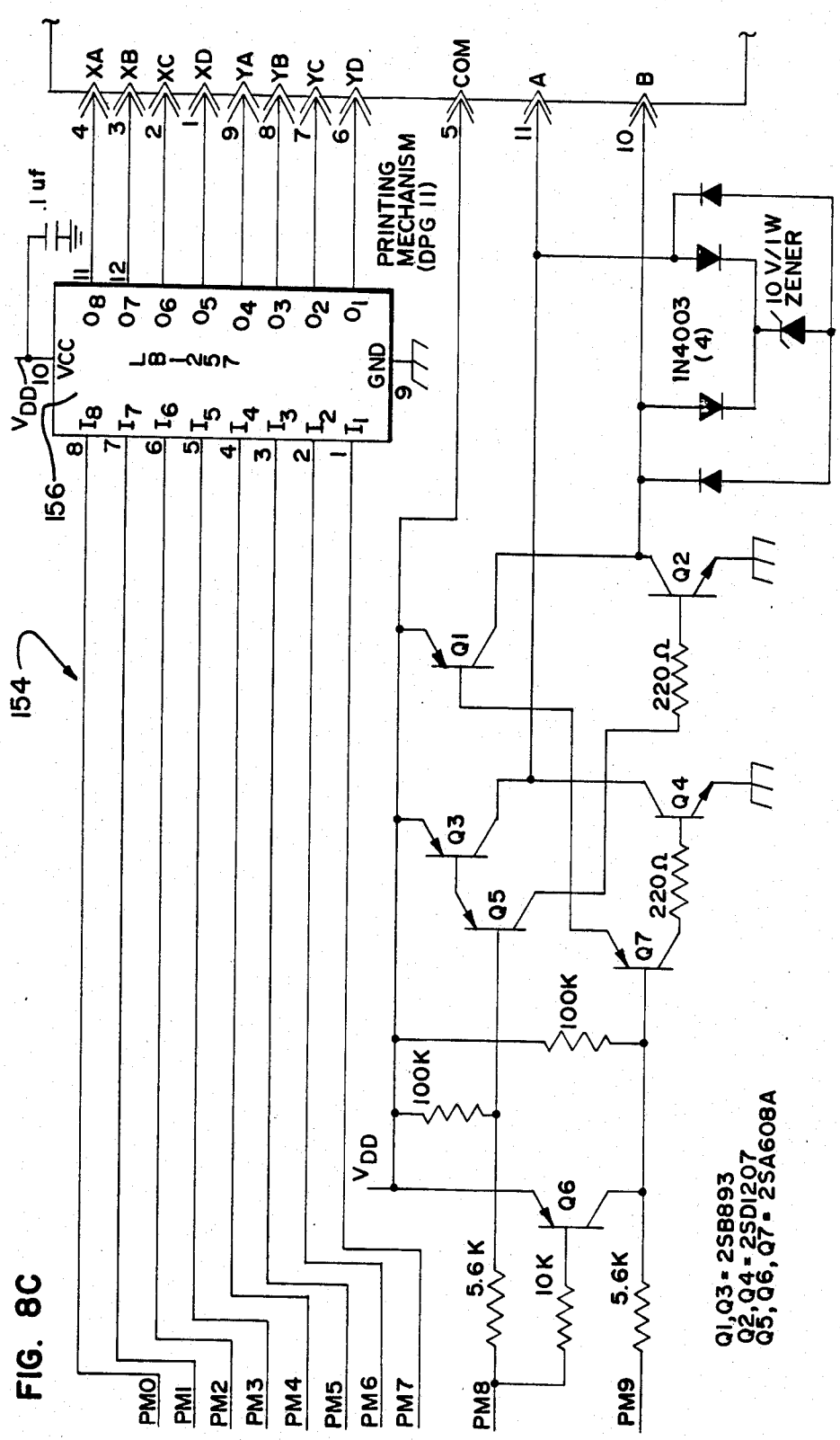

The control microprocessor 150 provides the controlling function for the keyboard 62, the printer control microprocessor 152, and the LCD display 66. The control microprocessor 150 includes a microcoded ROM with the application/operating program. The control microprocessor 150 has an internal clock whose frequency is controlled by a quartz crystal 156 and a pair of capacitors 158, 160. The control microprocessor 150 decodes character and symbol codes and commands entered at the keys 64 and received via input ports P20 through P24 and executes via output ports P10 through P17, P26, P27, and DB0 through DB7 so as to control the printer control microprocessor 152 and the LCD display 66, respectively. It will be appreciated that the application program of the labeler apparatus 40 can be modified for different features and functions by changing the ROM in the control processor 150. While a typical configuration is shown in FIG. 8A, it will be appreciated that the microprocessor might take on any number of configurations. Many similar integrated circuits are available commercially.

The printer control microprocessor 152 is an 8-bit CMOS microprocessor which contains a preprogrammed ROM with microcoded software specifically designed to control the ALPS DPG11 printing mechanism. ASCII character codes and graphic commands are input on lines R00 through R03 and R10 through R12 from the control microprocessor 150. The printer control microprocessor 152 translates these commands to a control sequence output on lines R50 through R53, R60 through R63, and D4, D5 which control the printer mechanism 70 via printer drive circuitry 154.

The printer drive circuitry 154 includes an integrated circuit (LB1257) with low saturation outputs which drive the X-Y motor phases of the printer mechanism 70. This device converts the low current output from the printer control microprocessor 152 to the high current required by the printer mechanism 70. Transistors Q1 through Q7 provide current drive to enable energizing the pen-up and pen-down solenoids in the printer mechanism. The outputs of Q1, Q2 include spark killer diodes to prevent damage to the transistors whenever the solenoids are energized and deenergized. It will be appreciated that the printer control microprocessor 152 and the printer drive circuitry 154 may vary depending on the specific X-Y plotter apparatus being utilized. Further, such control microprocessors and printer drive circuitry are commercially available, as is evidenced by the ALPS DPG 11 printer apparatus.

The LCD display circuitry 158 provides all the required timing and dot pattern generation for the LCD display 66. The LCD circuitry also contains memory for storing ASCII characters from the control processor 150. Up to eighty ASCII characters can be stored in the LCD control circuitry 158, however only sixteen may be displayed at any time. The control processor 150 sends commands and data to the LCD circuitry 158 via lines DB0 through DB7. A read-write signal transmitted determines whether the lines DB0 through DB7 are output (command and data) or input (status).

A keyboard encoder (74C923) 160 is a CMOS integrated circuit which scans the twenty key keypad matrix 84. The keyboard encoder 160 generates four output signals X1 through X4 to the column inputs of the keypad. Each X1 through X4 output is activated sequentially (non-simultaneously with each other). The inputs Y1 through Y5 are row inputs from the keypad. Whenever one of the keys 64 is depressed on the keypad, the X and Y lines are connected, thus generating a unique code for that particular key position. This code is output on lines A through E to the control microprocessor 150. The DA output signal notifies the control microprocessor 150 when an active code is available, that is, a key depressed on the A through E lines.

Figure 8D:
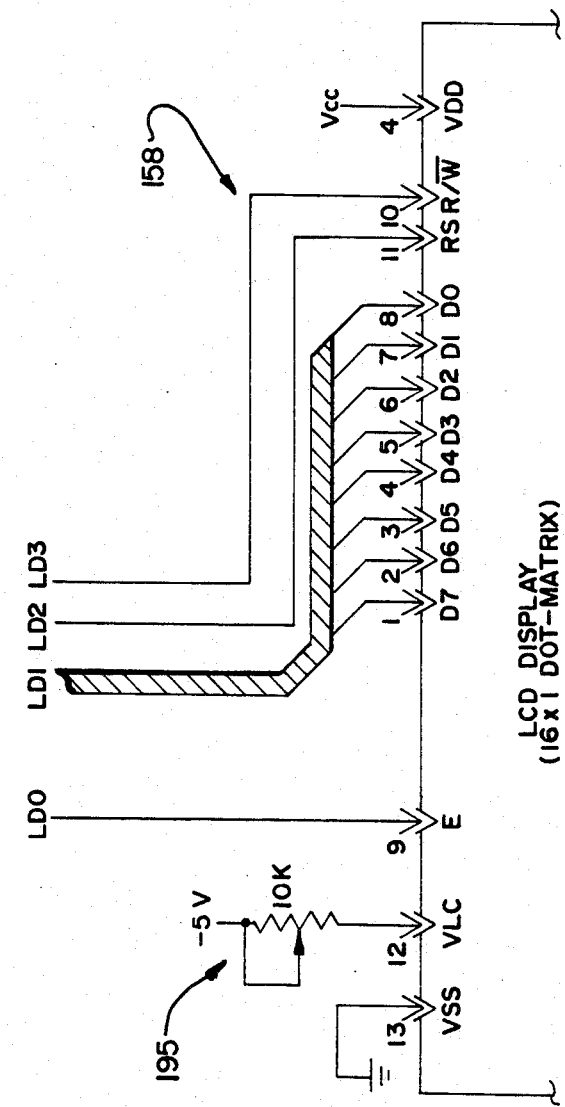
Figure 8E:
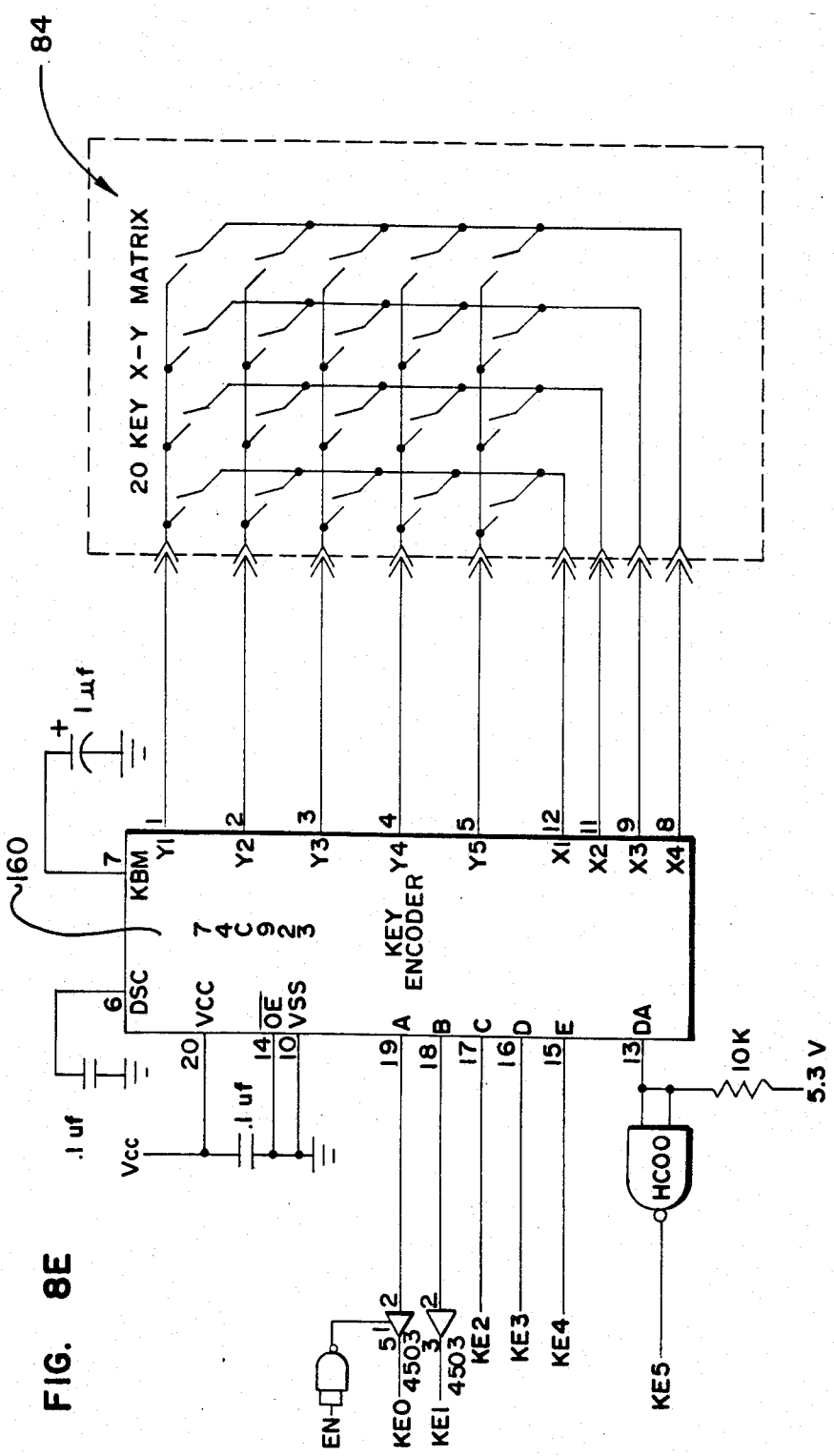
Figure 9A:
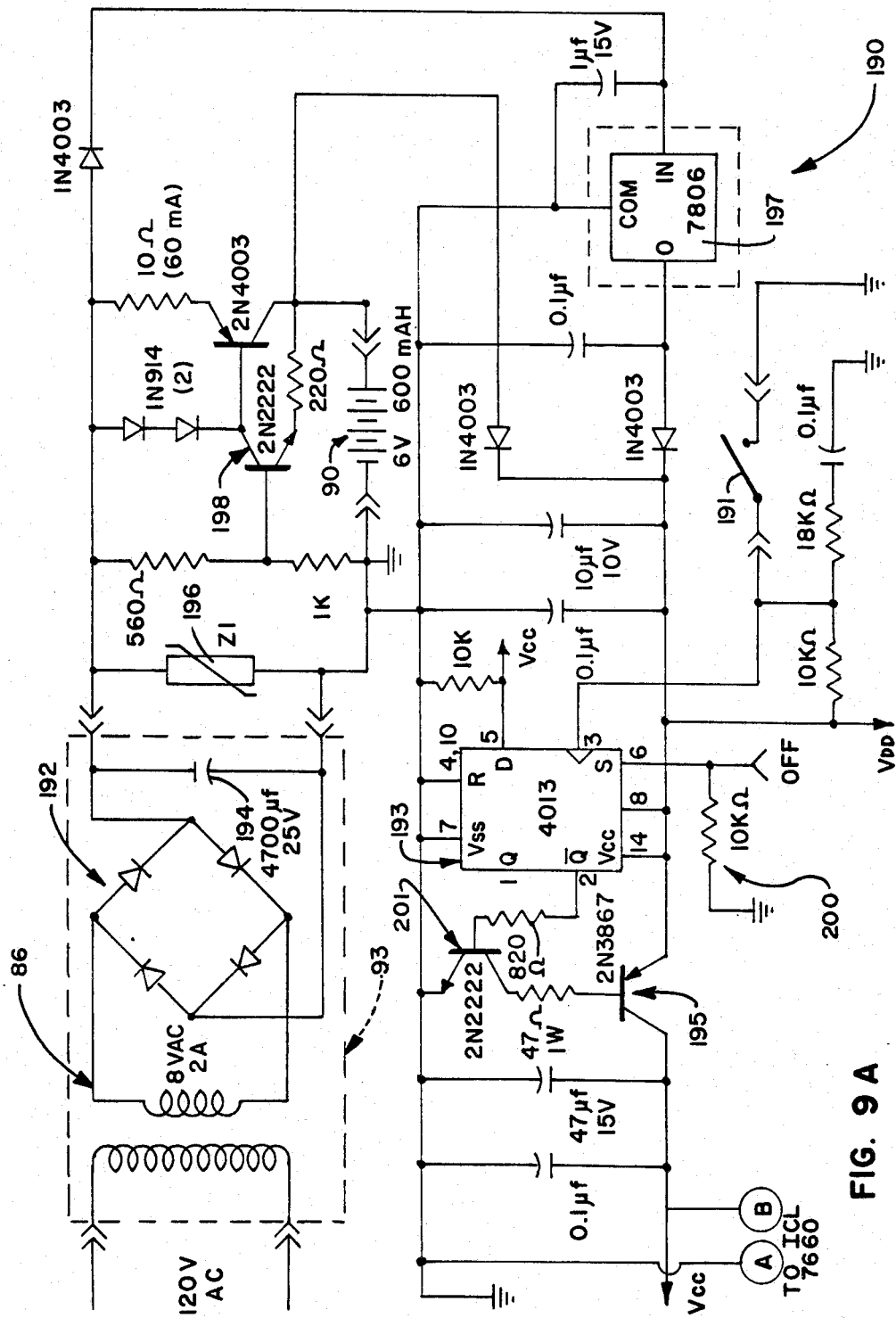
FIGS. 9A-B are a schematic of the power supply of the embodiment shown in FIG. 1.
Figure 9B:
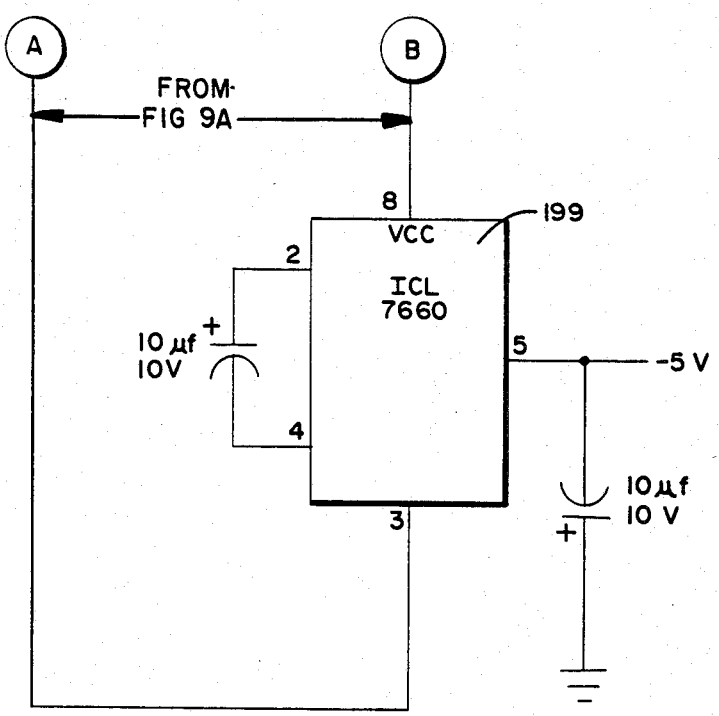
Figure 10:
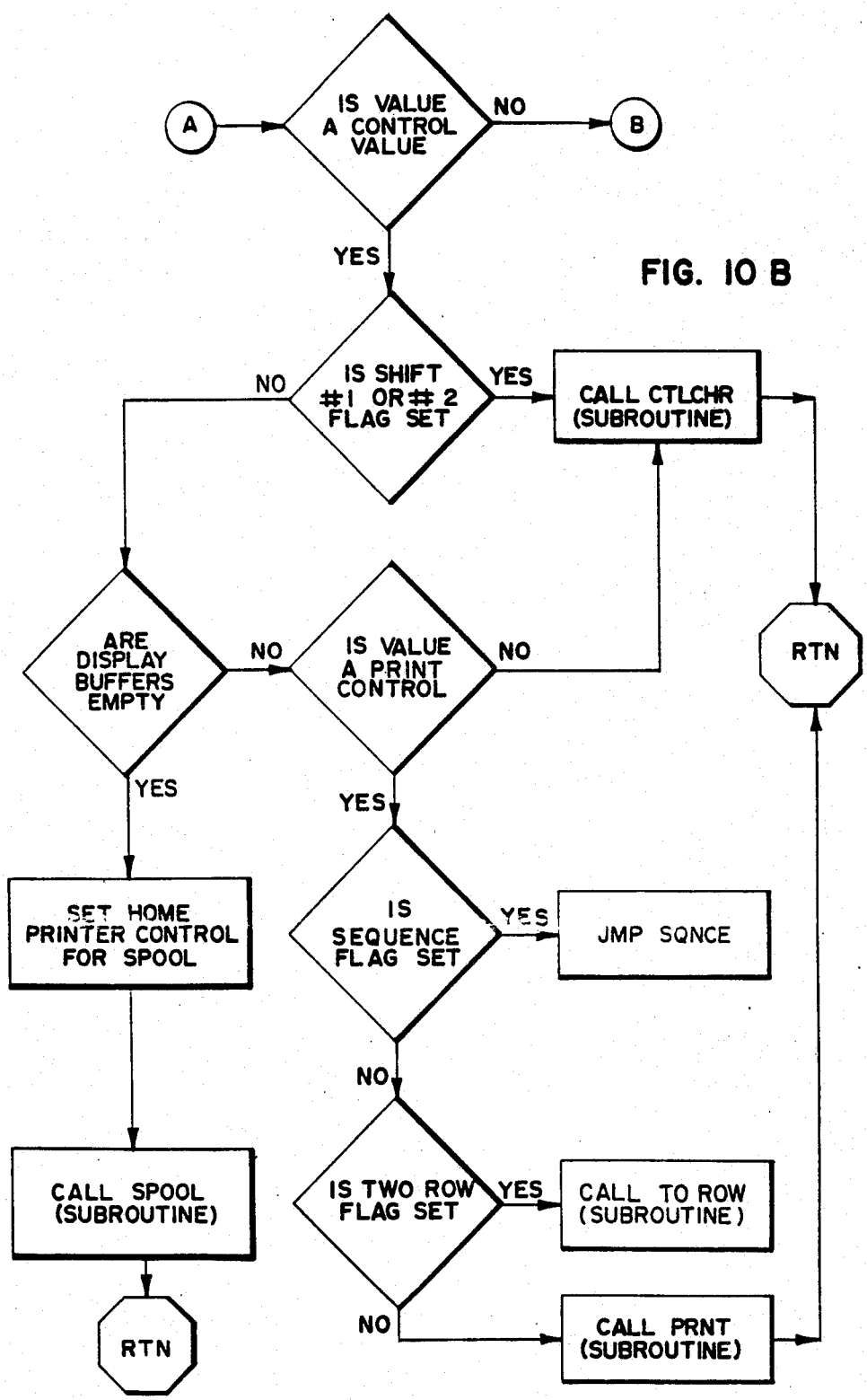
FIGS. 10A-D are logic flow diagrams of the keyboard subroutine of the embodiment shown in FIG. 1.
Figure 10:
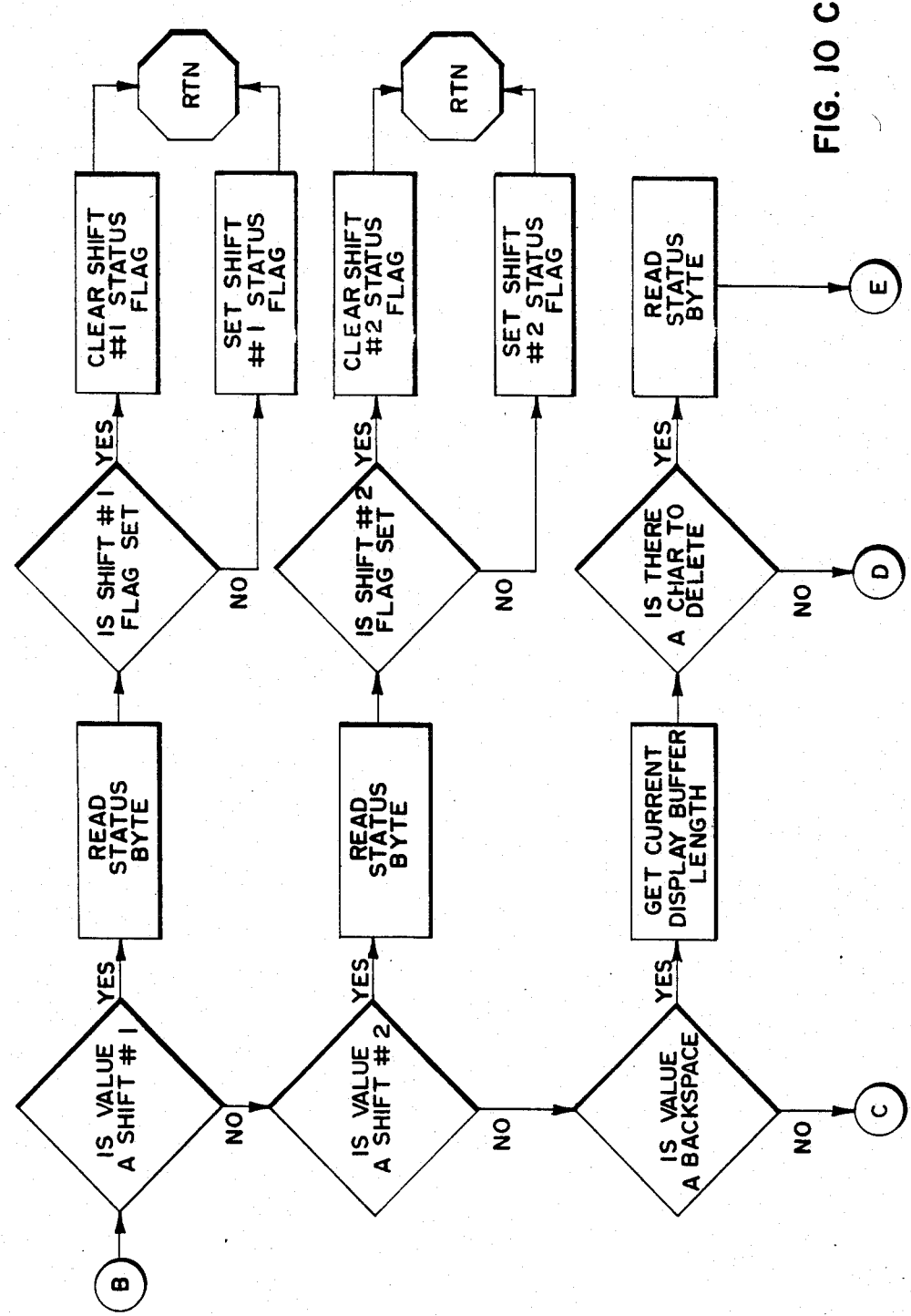
Figure 10:
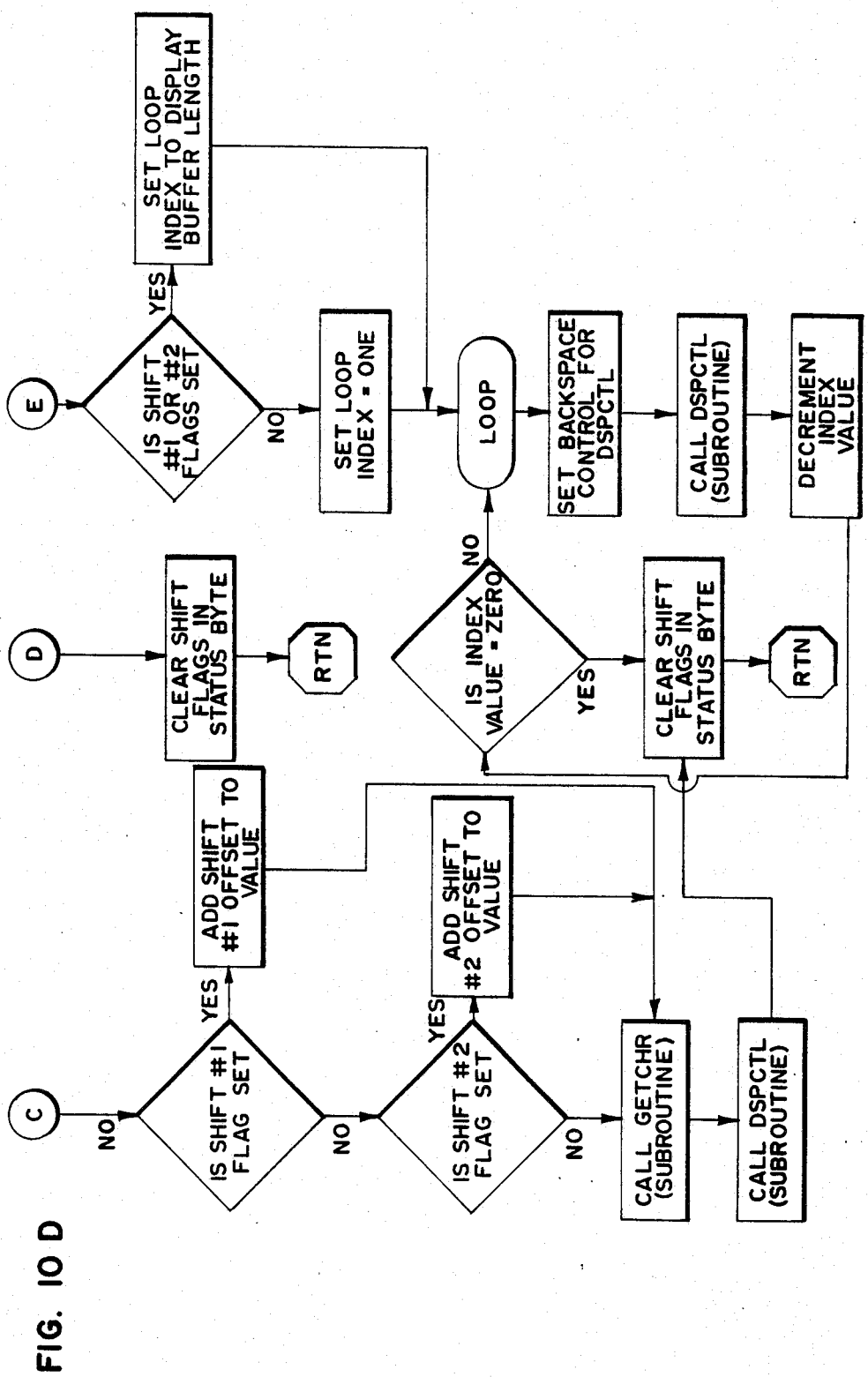
Figure 11A:
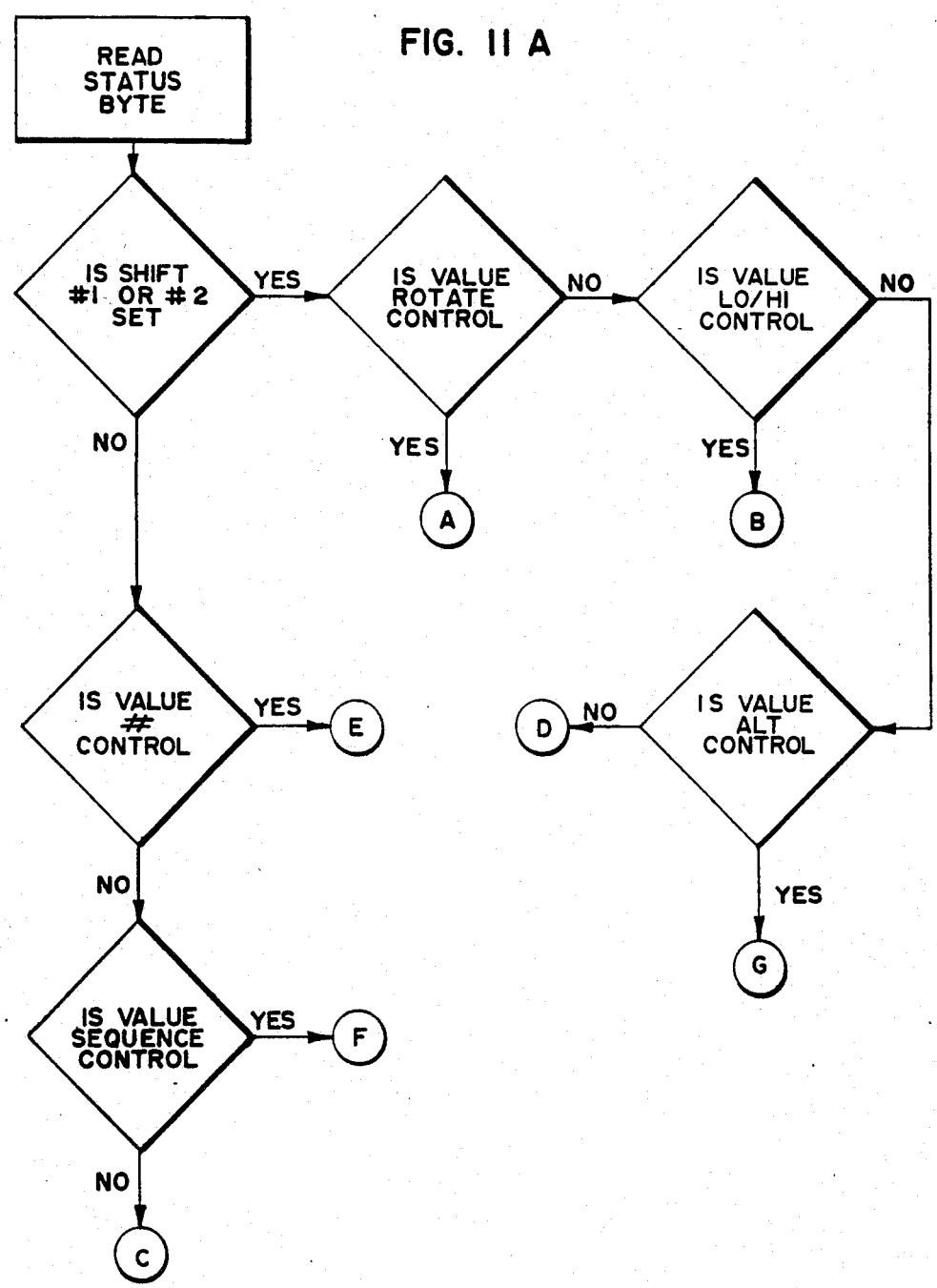
FIGS. 11A-I are logic flow diagrams of the control key subroutine of the embodiment shown in FIG. 1.
Figure 11:
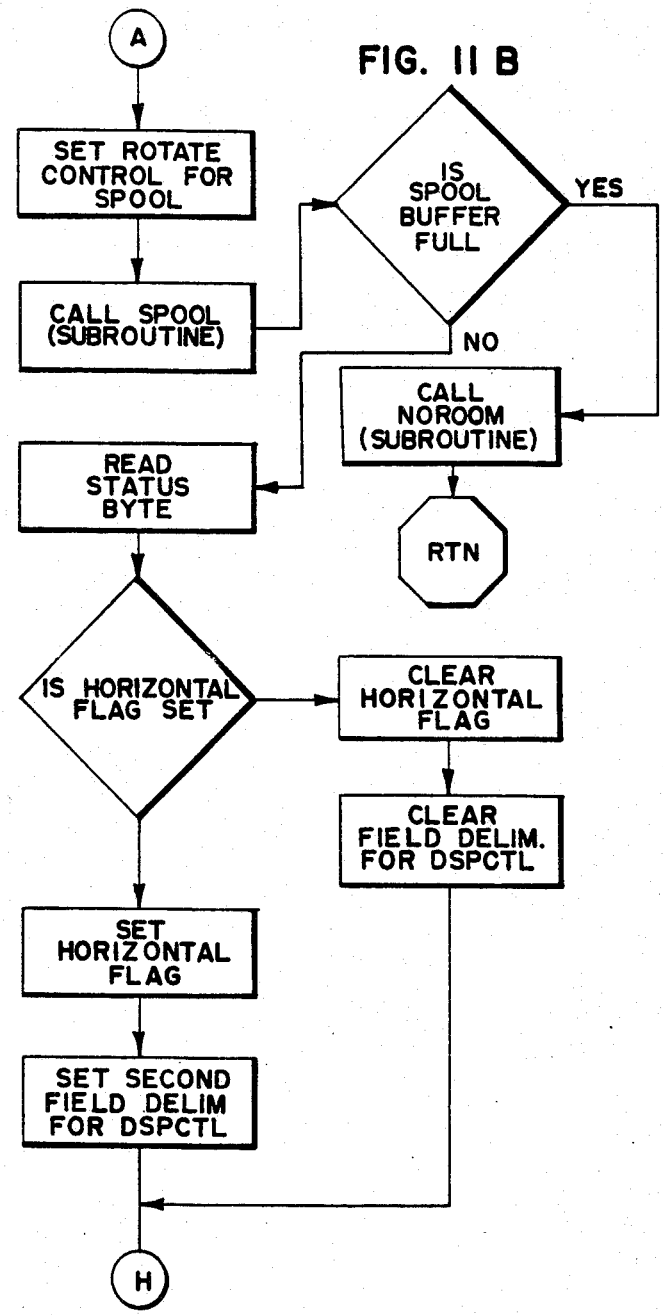
Figure 11:
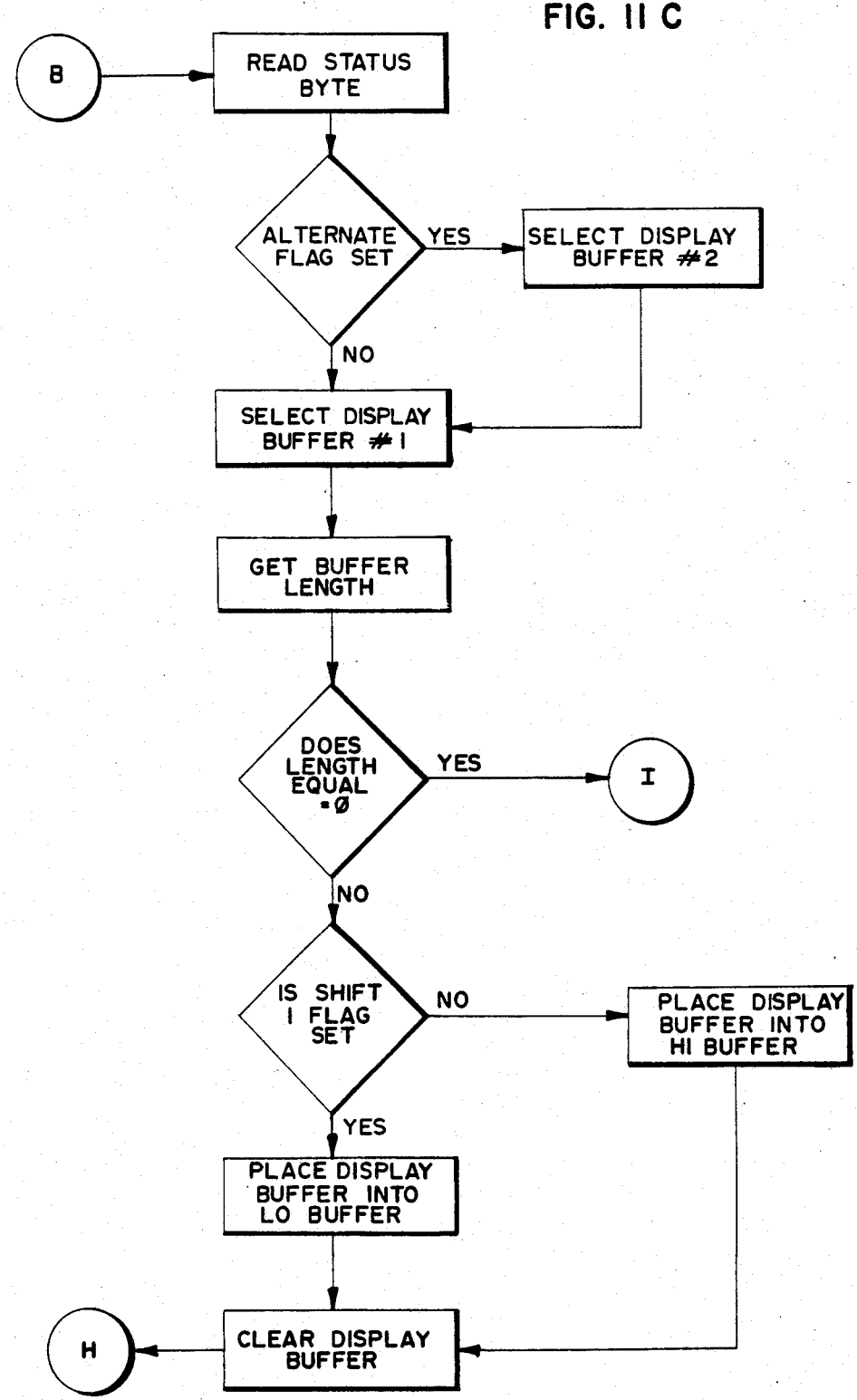
Figure 11F:
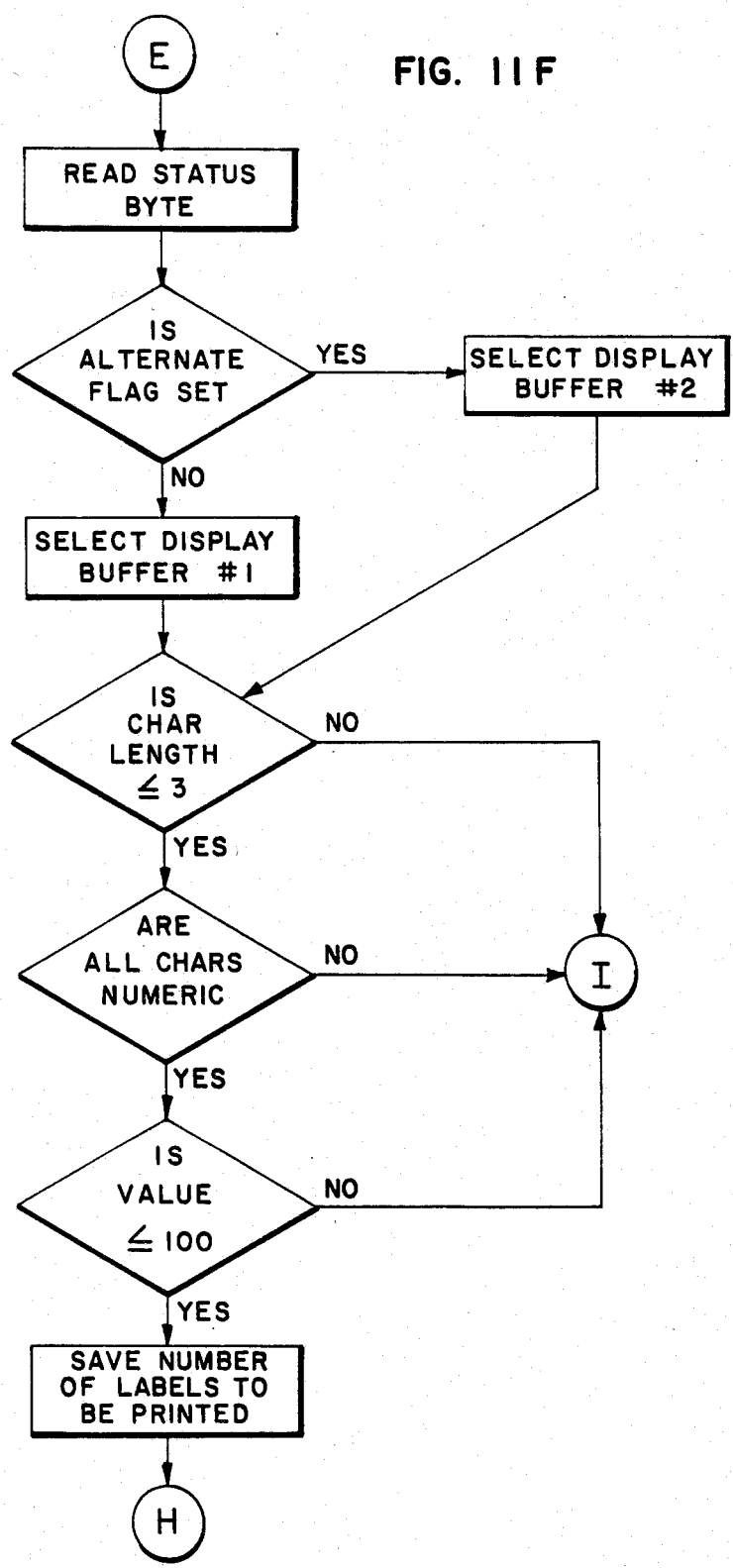
Figure 11:
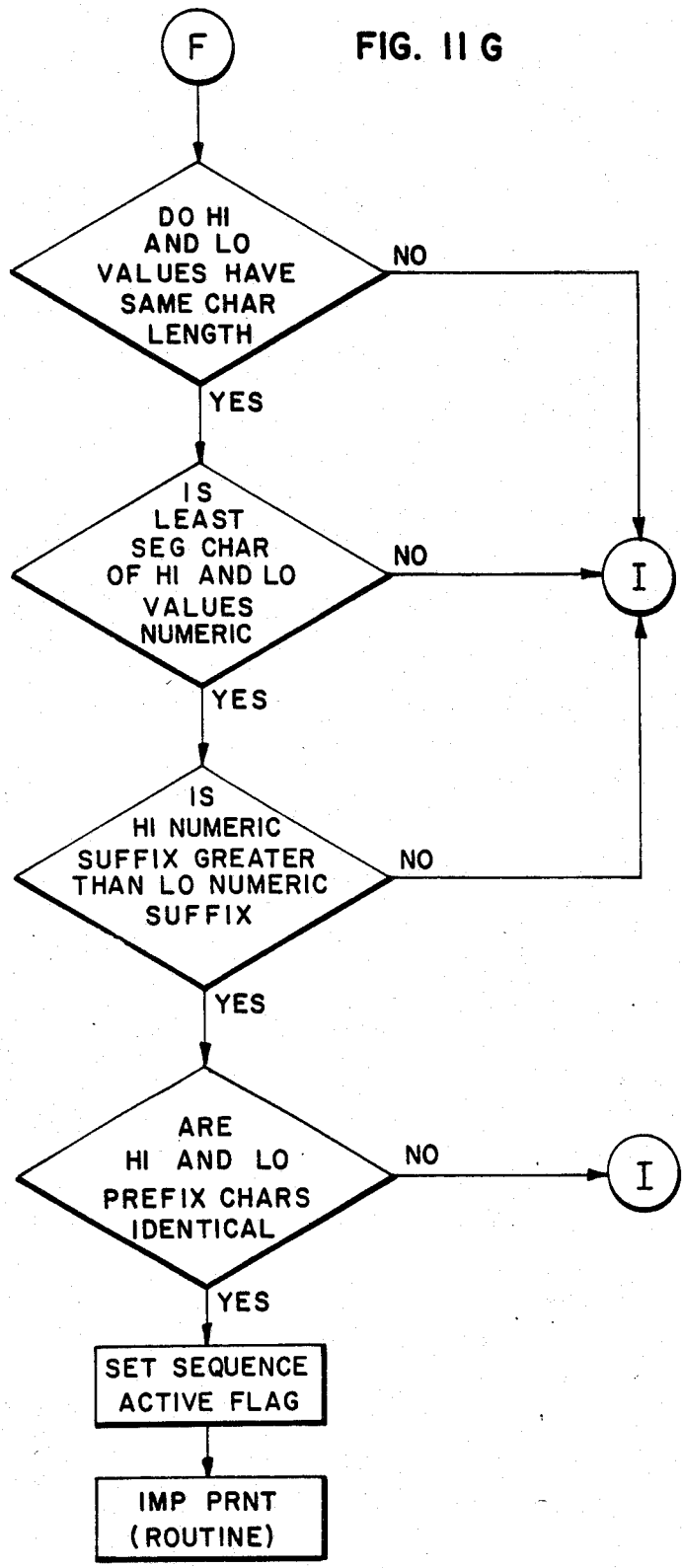
Figure 11H:
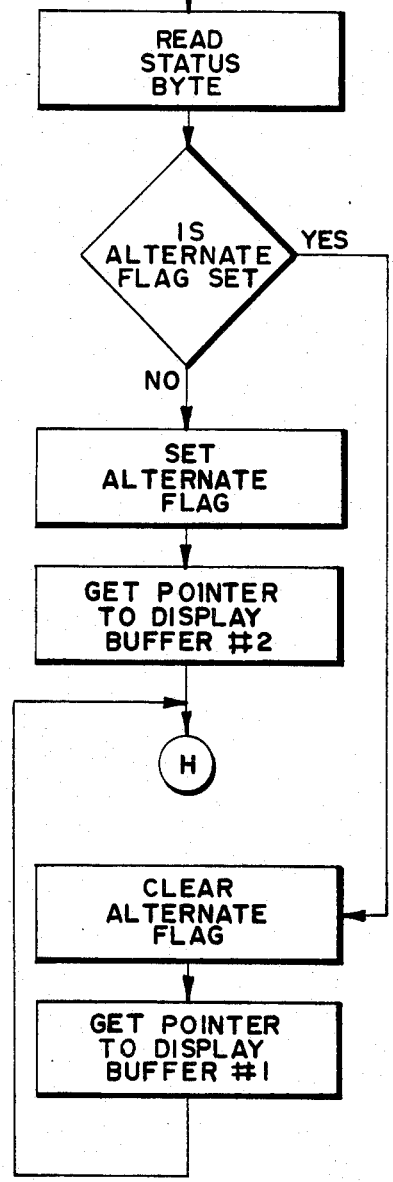
Figure 11I:
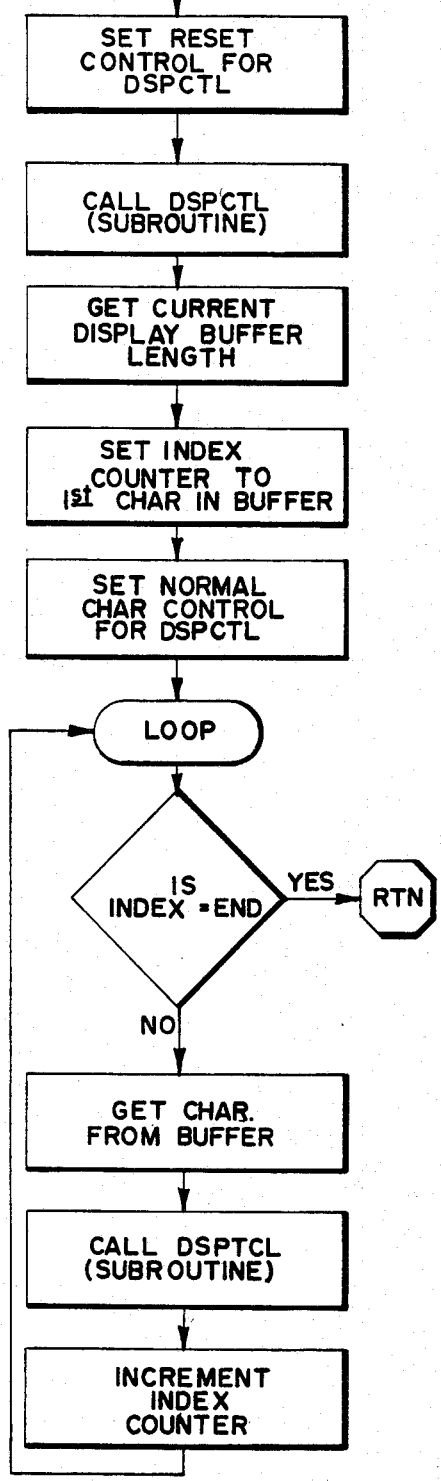
Figure 12:
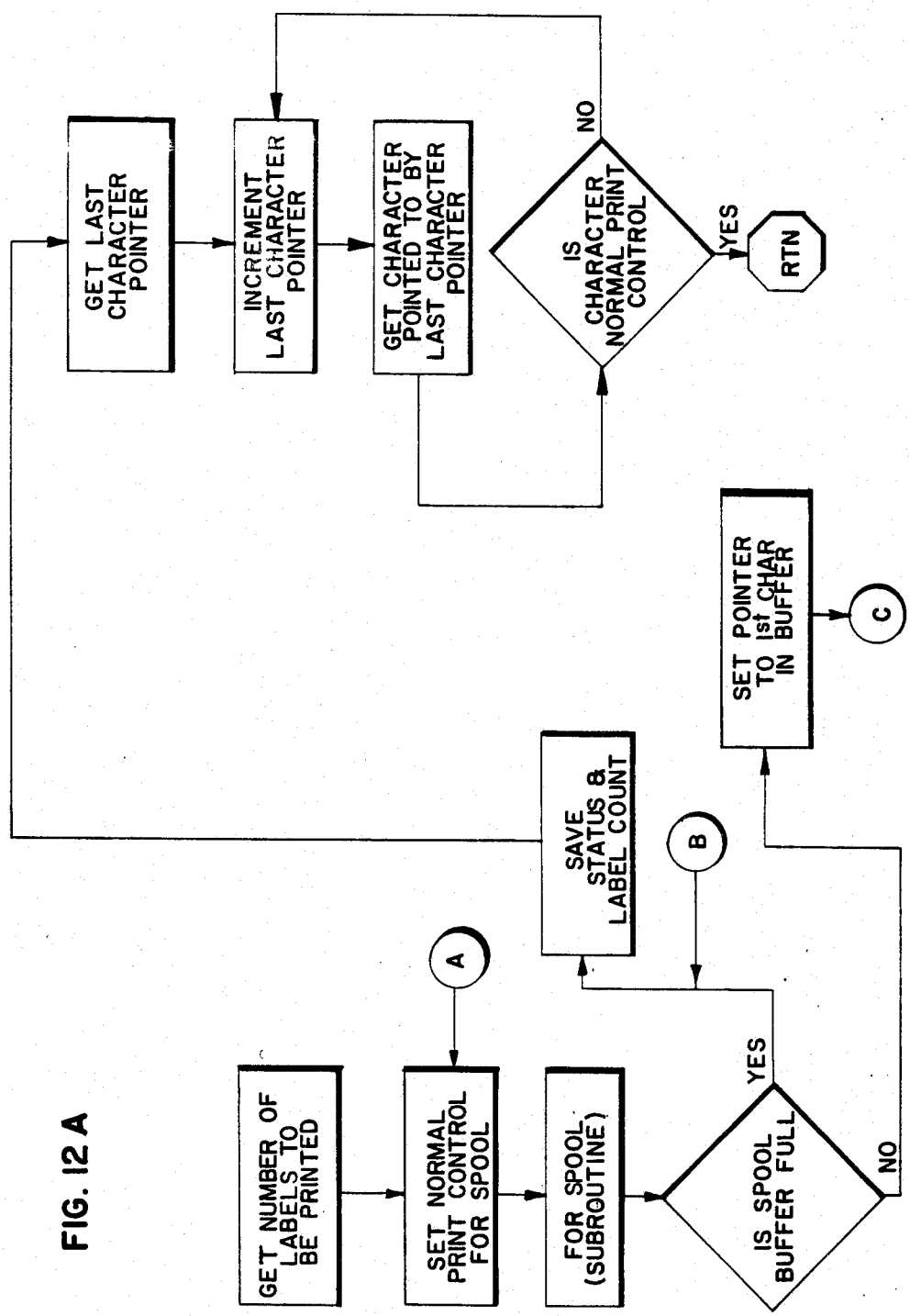
FIGS. 12A-D are logic flow diagrams of the print subroutine of the embodiment shown in FIG. 1.
Figure 12:
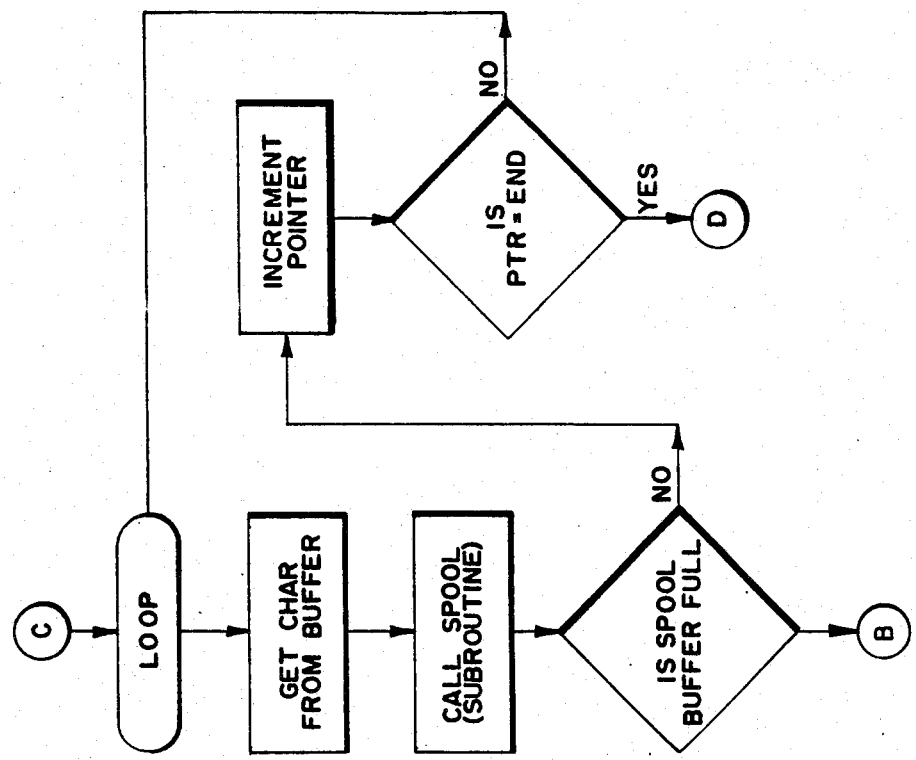
Figure 12:
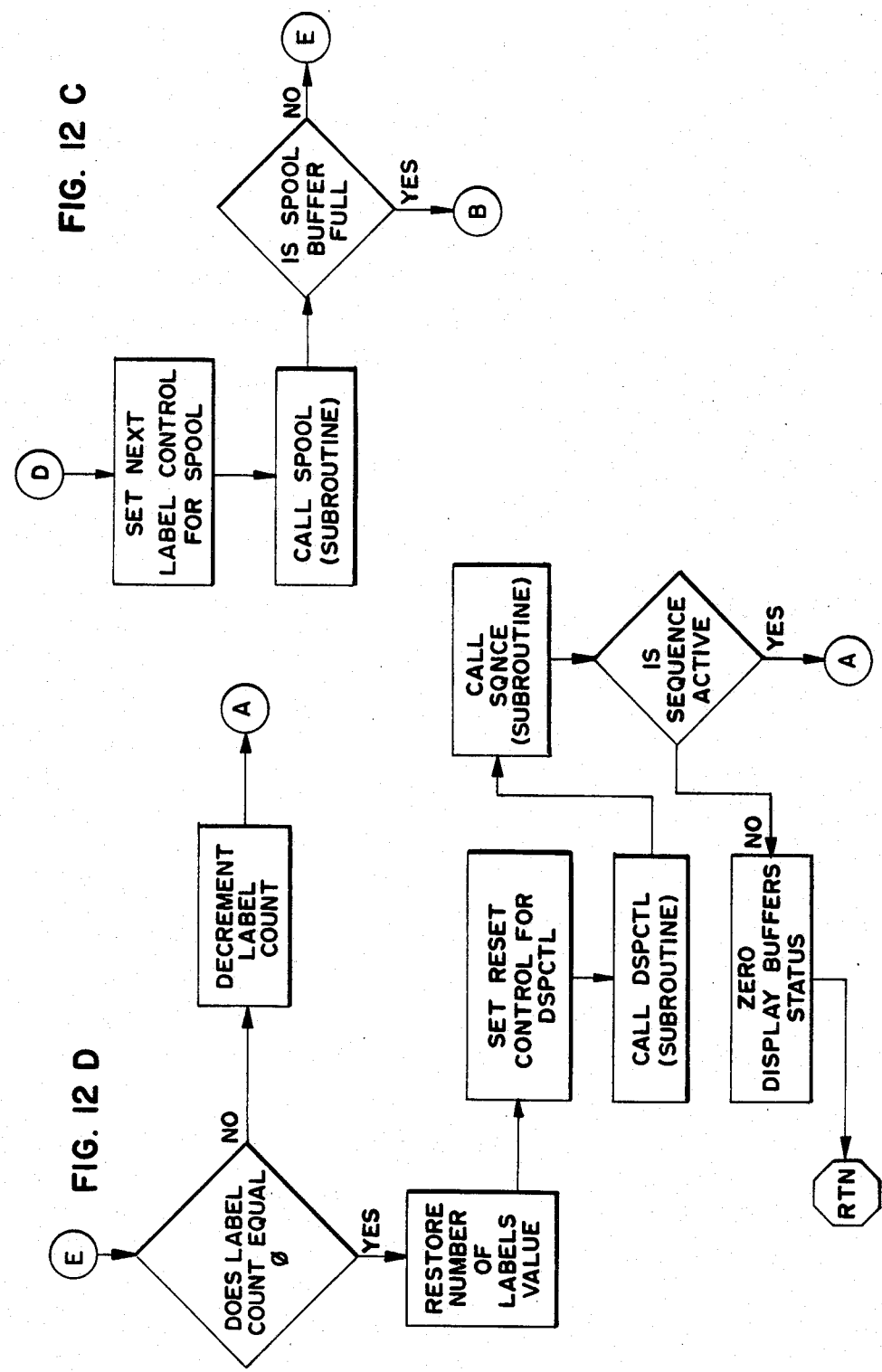
Figure 13:
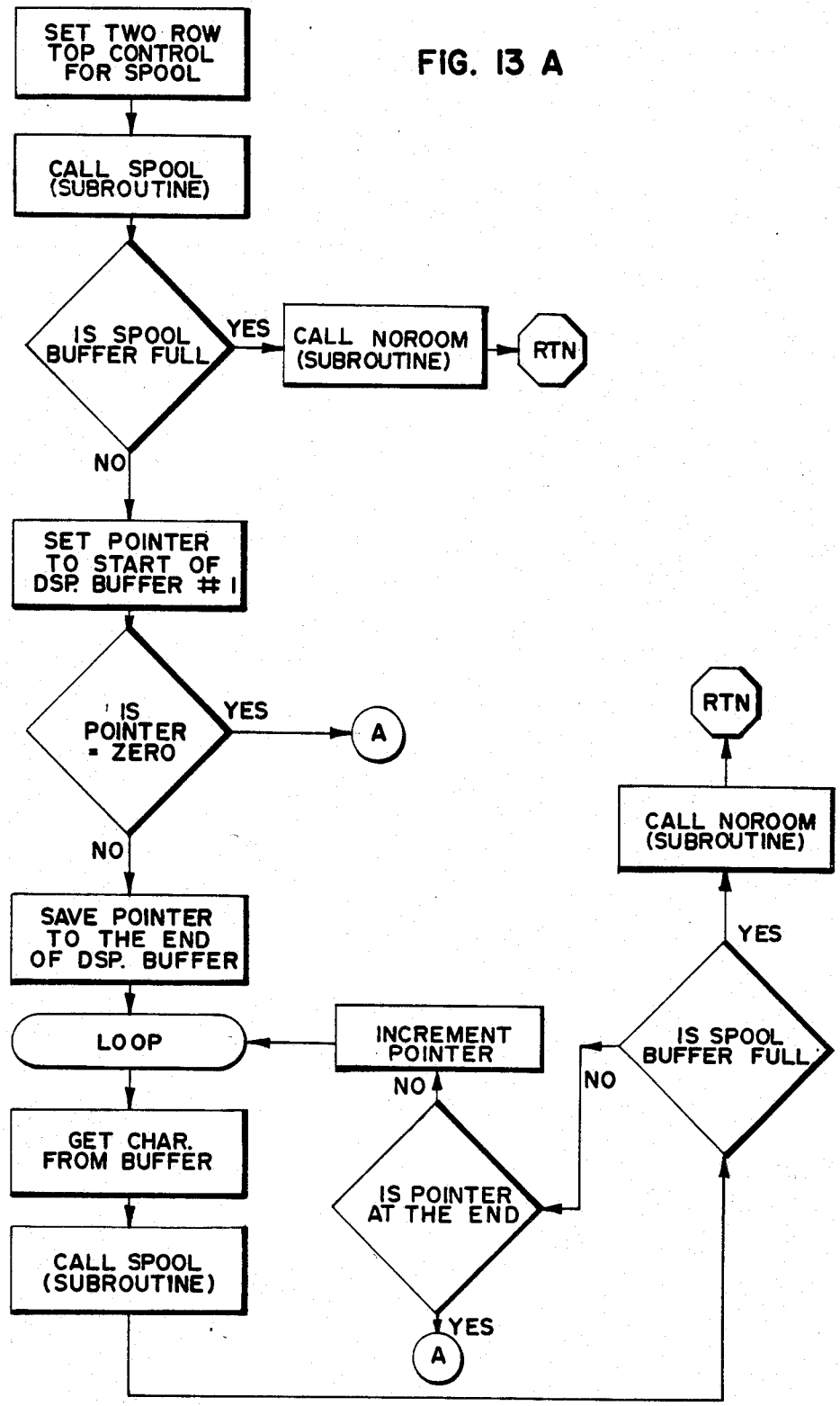
FIGS. 13A-B are logic flow diagrams of the two row subroutine of the embodiment shown in FIG. 1.
Figure 13:
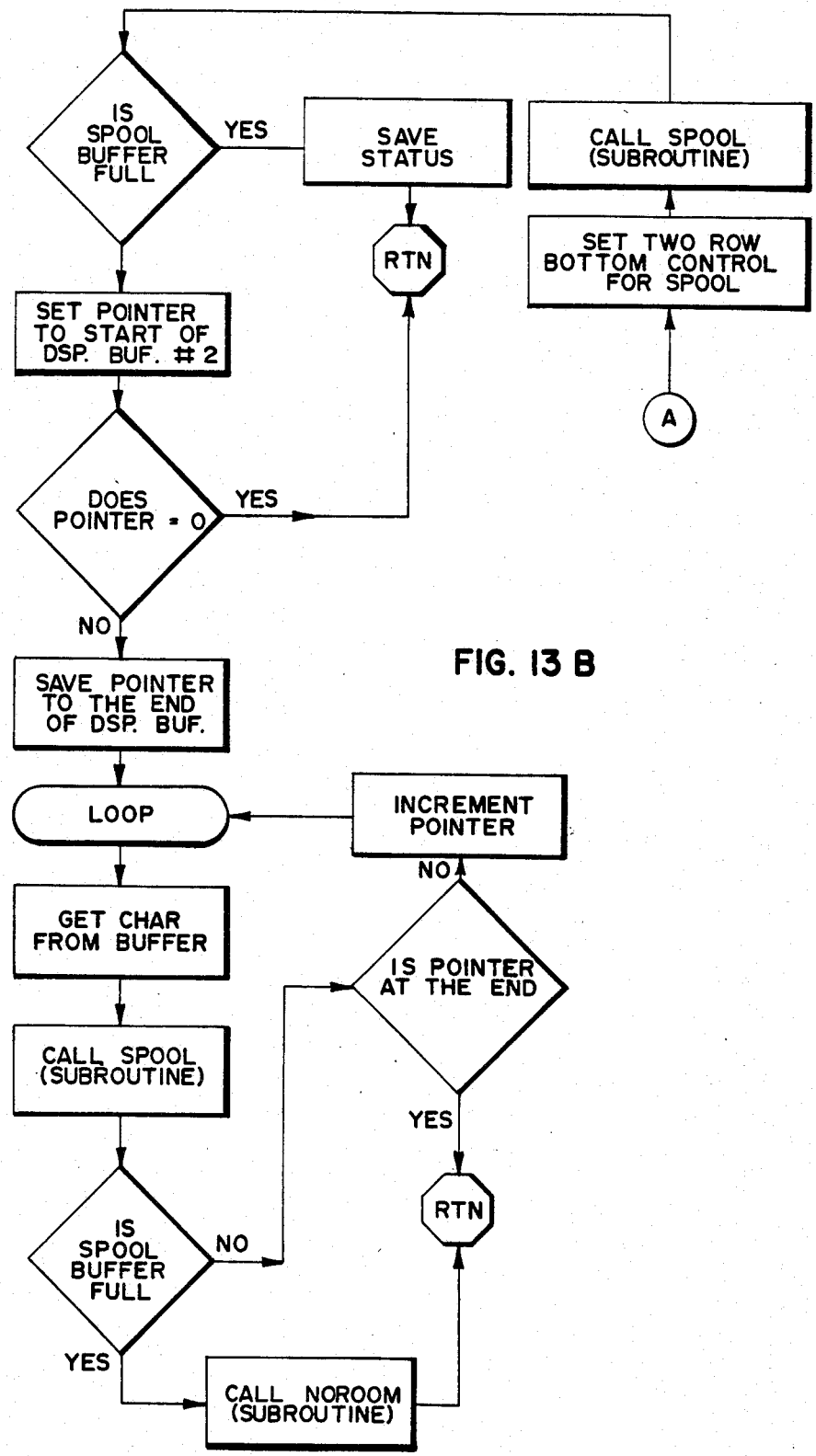

Illustrated in FIGS. 9A & B is power supply circuitry 190 of the labeler apparatus 40. As previously indicated, labeler apparatus 40 includes the adapter 92 to allow input from the DC wall plug-in power supply 93. Output of the transformer 86 is eight volts at two amps which is full wave rectified by a diode bridge 192. One 4700 microfarad electrolytic capacitor 194 provides filtering of the rectified AC signal and energy storage for printer operation. A transient zener diode (Z1) 196 is provided for protecting the nicad batteries 90 and voltage regulator 197 against transient spikes. As illustrated in FIG. 9A, a "taper charger" charging circuit 198 is utilized to prevent overcharging of the batteries. Initially, transistors 2N4033 and 2N2222 provide full charge if battery voltage is less than five volts. As battery voltage rises, transistors 2N4033 and 2N2222 are turned off, preventing overcharge and resulting damage to the batteries. The voltage regulator 197 regulates the unregulated voltage from the diode bridge/electrolytic capacitors to a regulated +6 volts to the labeler control circuitry. A voltage converter integrated circuit (ICL 7660) 199, illustrated in FIG. 9B, converts the +6 voltage from the regulator to −5 volts for the LCD display circuitry. The −5 volts goes to the LCD display circuitry through a 10K potentiometer 195 as illustrated in FIG. 8D which allows adjusting of the LCD display contrast. The ON/OFF key switch is represented by reference numeral 191. The labeler apparatus is turned on by depressing and releasing the switch 191. Upon releasing switch 191, a positive going (O-Vcc) pulse is seen at the clock input of a flip-flop 193, causing the voltage at the flip-flop's 193 data input to be logically inverted and presented at the flip-flop's 193 not Q output. Since transistor 195 is off, Vcc is not supplied to the flip-flop's 193 data input and is therefore at ground potential due to a 10k 200 pull-down resistor thus presenting Vcc at the not Q output of flip-flop 193. The voltage Vcc at the not Q output of flip-flop 193 turns on transistor (2N2222) 201 which turns on transistor (2N3867) 195, thus supplying power (Vcc) to the circuitry.

To turn off the labeler apparatus, switch 191 is depressed and released. Upon releasing switch 191, a positive going (O-Vcc) pulse is seen at the clock input of flip-flop 193, causing the voltage at the flip-flop's 193 data input to be logically inverted and presented at the flip-flop's 193 not Q output. Since transistor 195 is on, Vcc is supplied to the flip-flop's 193 data input thus presenting ground potential at the not Q output of flip-flop 193. The ground potential voltage at the not Q output of flip-flop 193 turns off transistor (2N2222) 201 which turns on transistor (2N3867) 195, thus disrupting power (Vcc) to the circuitry.

FIGS. 10A through 18B illustrate the various logical flow sequences followed by the application and control program in the control microprocessor 150.

FIGS. 10A through 10B illustrate the keyboard (KEYBRD) subroutine. The keyboard subroutine decodes the key pressed by the operator, then it performs one of the following functions:

(1) Calls the display (DSPCTL) subroutine if an alpha/numeric, space, +, −, /, BS, or CE key is pressed.
(2) Calls the print (PRNT) subroutine if the print key is pressed.
(3) Sets the corresponding flag if one of the SHIFT keys is pressed.
(4) Calls the control key (CTLCHR) subroutine if any other key is pressed.

FIGS. 11A through 11I illustrate the control key (CTLCHR) subroutine. The control key subroutine decodes which control key the operator pressed on the keyboard, then it performs one of the following:

(1) If the # key was pressed, the value in the display is checked for a numeric value less than or equal to 100 (an error) is displayed if greater than 100 or value is non-numeric). When the value is valid, it is saved for use in the PRNT subroutine.
(2) if the SEQ key was pressed, the values stored in the LO and HI memory locations are compared as follows:
   (a) At least the last value of the LO and HI character strings must be a number.

(b) The numeric suffix in the LO string must be less than the HI string.
(c) The LO and HI strings must be of equal length.
(d) The LO and HI alpha/numeric prefix must be identical (the first non-numeric character encountered, from right to left, defines the end of the alpha/numeric prefix).

If any of the previous conditions are not met, an error message is displayed, else the sequence flag is set and the PRNT subroutine is called.

(3) If the LABEL key was pressed, the character string in the display is compared to valid label configurations. If there is not a match between the string and the valid configurations, an error is displayed, else the selected label is flagged and the printer is configured to label size, character size, and character orientation.

(4) If the ROT key was pressed, the printer is configured to rotate the characters printed 90 degrees.

(5) If the LO key was pressed, the character string displayed is entered into the LO memory location. If no string is detected, an error is displayed.

(6) If the HI key was pressed, the character string displayed is entered into the HI memory location. If no string is detected, an error is displayed.

(7) If the ADV key was pressed, the plotter pen is advanced one millimeter.

FIGS. 12A through 12D illustrate the print (PRNT) subroutine. The print subroutine transfers characters from the display buffer to the spool buffer, in conjunction with the spool subroutine, and also adds a print start of string and an end of string character around the data. The subroutine places the data into the spool buffer the number of times determined by the # key (1 is the default value). When the spool buffer is full, a message is displayed until more data may be entered into it.

FIGS. 13A through 13B illustrate the two row (TOROW) subroutine. The two row subroutine performs much the same as the PRNT SUBROUTINE, except top row and bottom row start of string is added in place of a print start of string, thus allowing for two rows of alpha/numeric strings to be printed on one label.

Figure 14A:
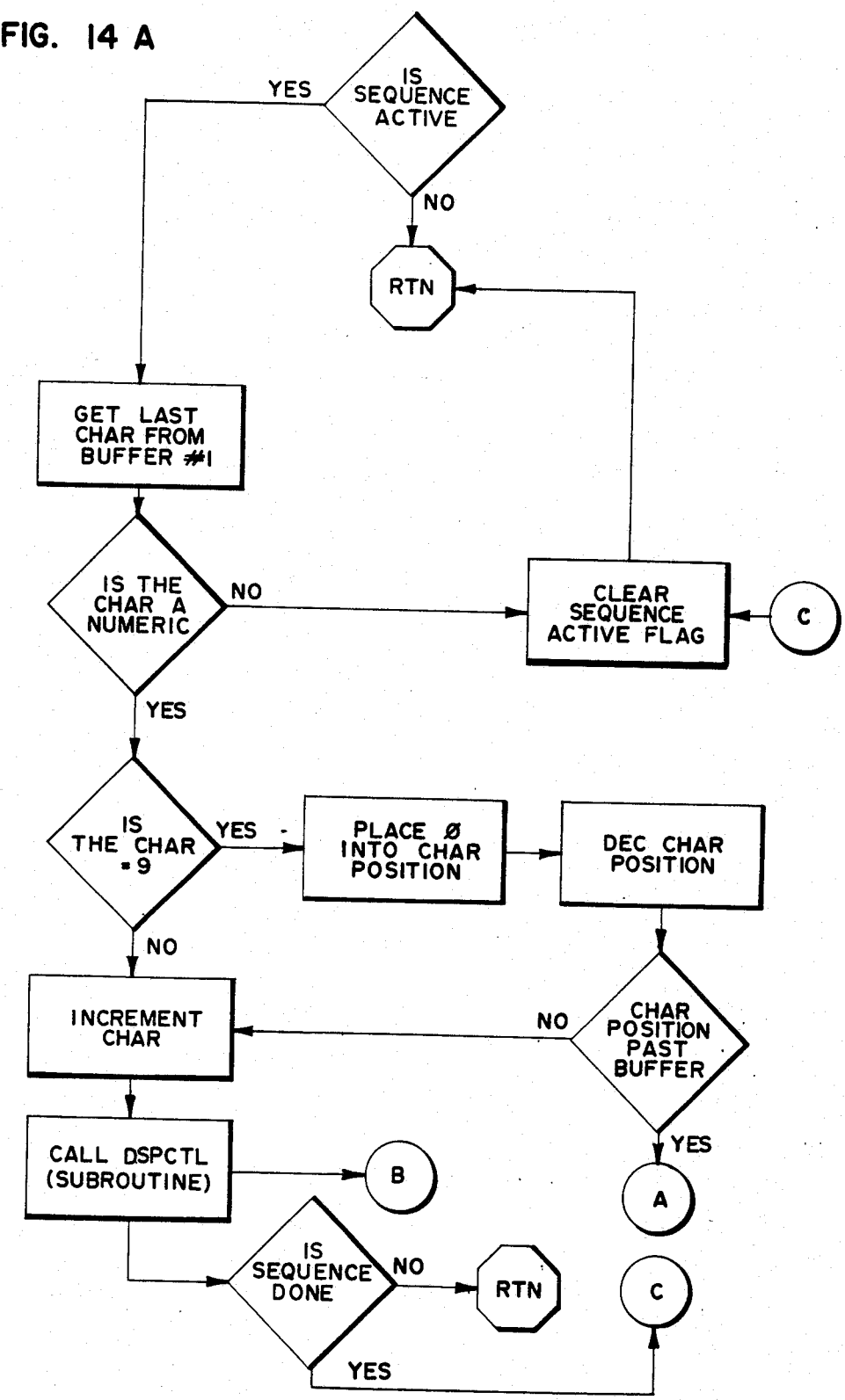
FIGS. 14A-B are logic flow diagrams of the sequence subroutine of the embodiment shown in FIG. 1.
Figure 14:
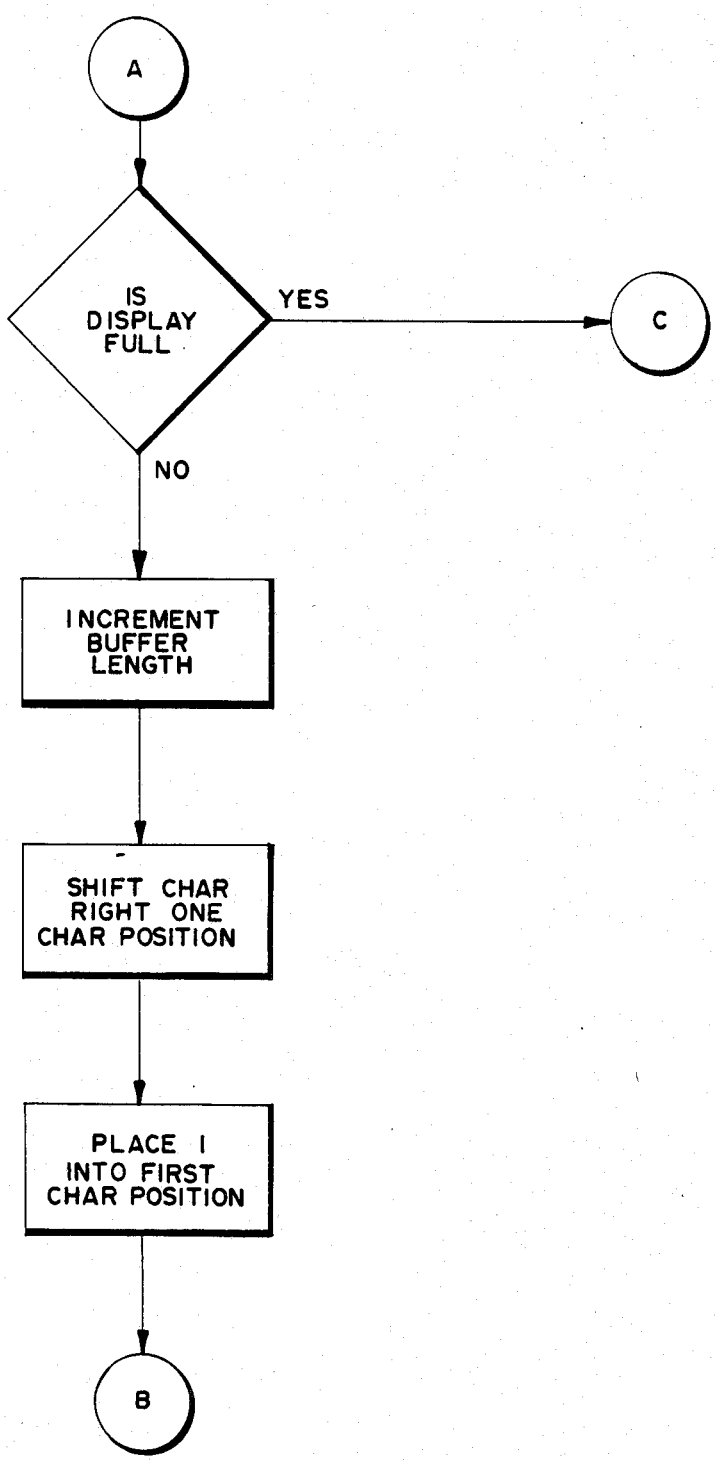

FIGS. 14A through 14B illustrate the sequence (SQNCE) subroutine. The sequence subroutine increments the LO value up to the HI value. When both LO and HI values are equal, the sequence active flag is cleared.

Figure 15:
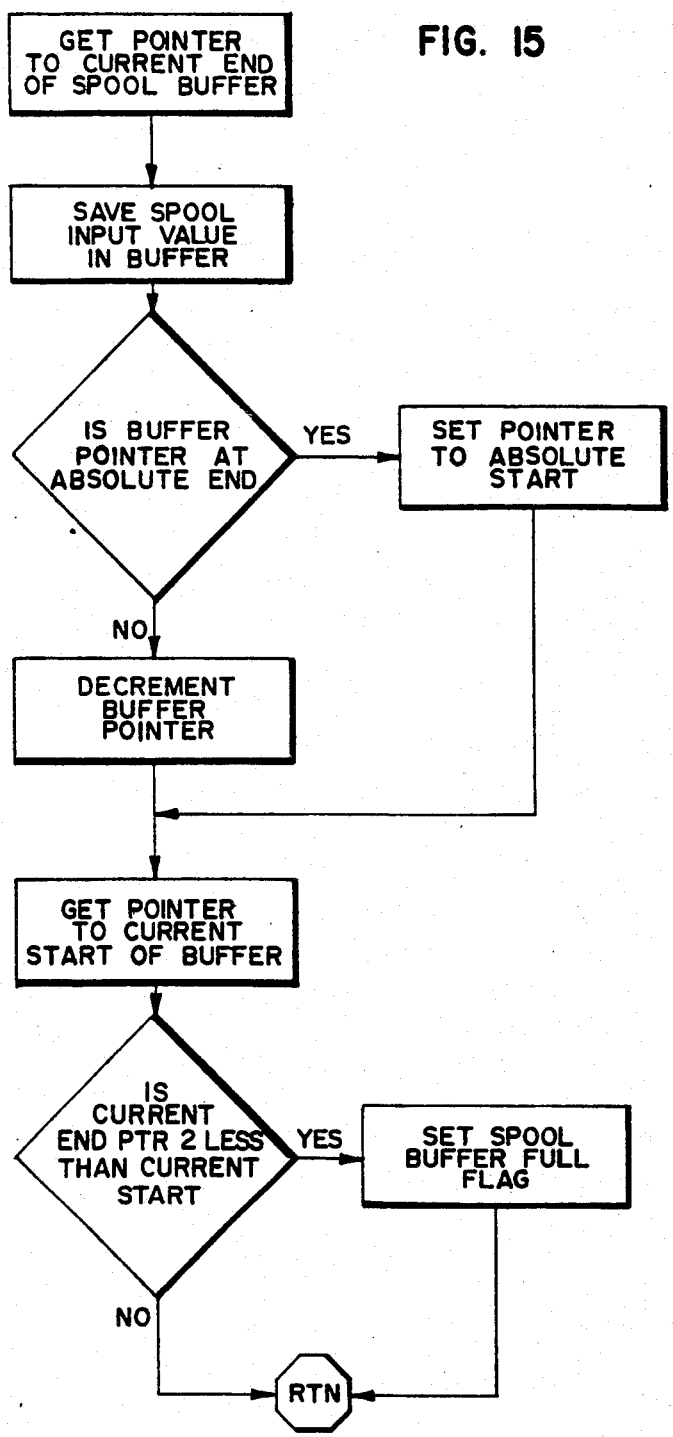
FIG. 15 is a logic flow diagram of the spool subroutine of the embodiment shown in FIG. 1.
Figure 16A:
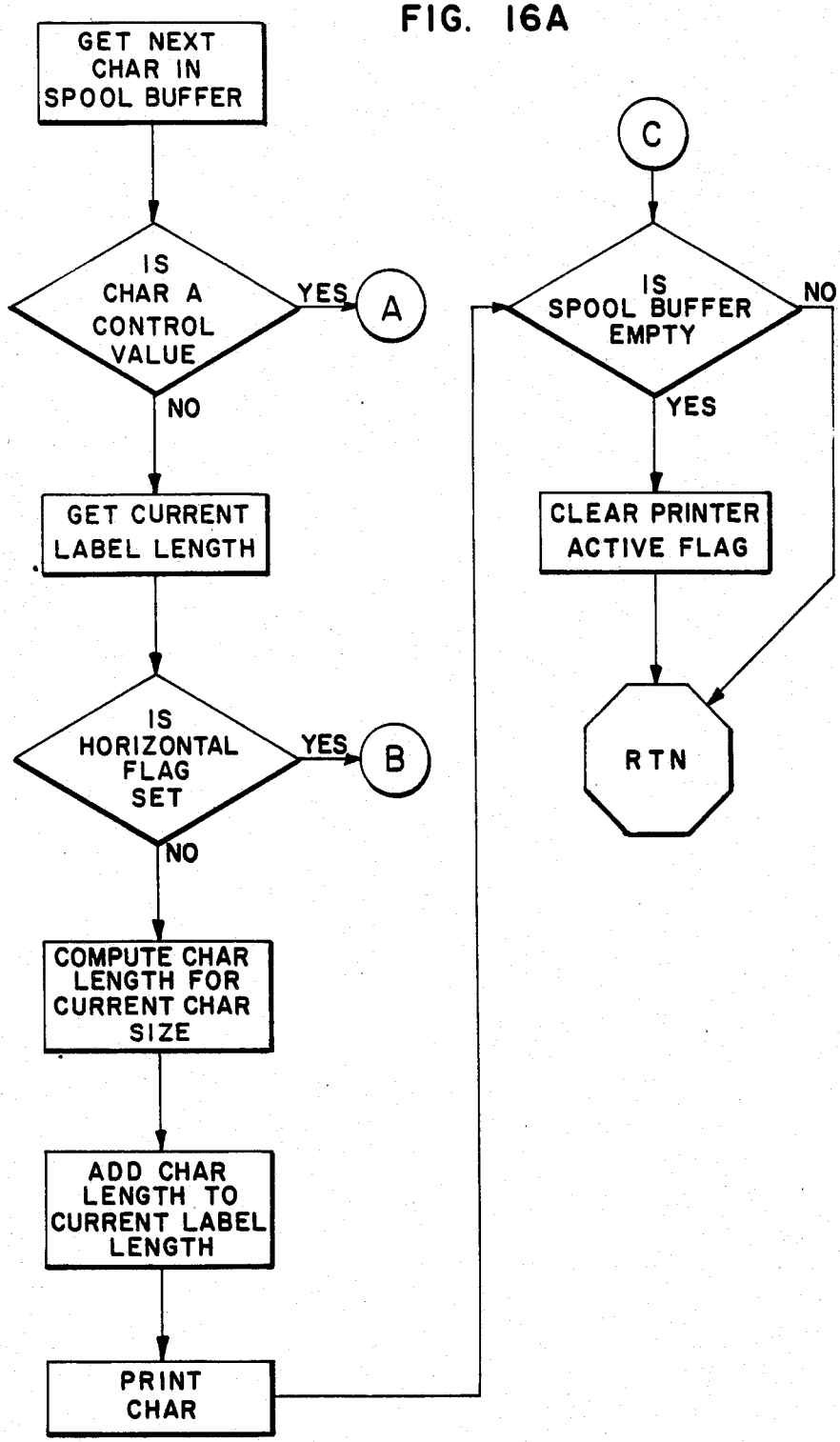
Figure 16B:
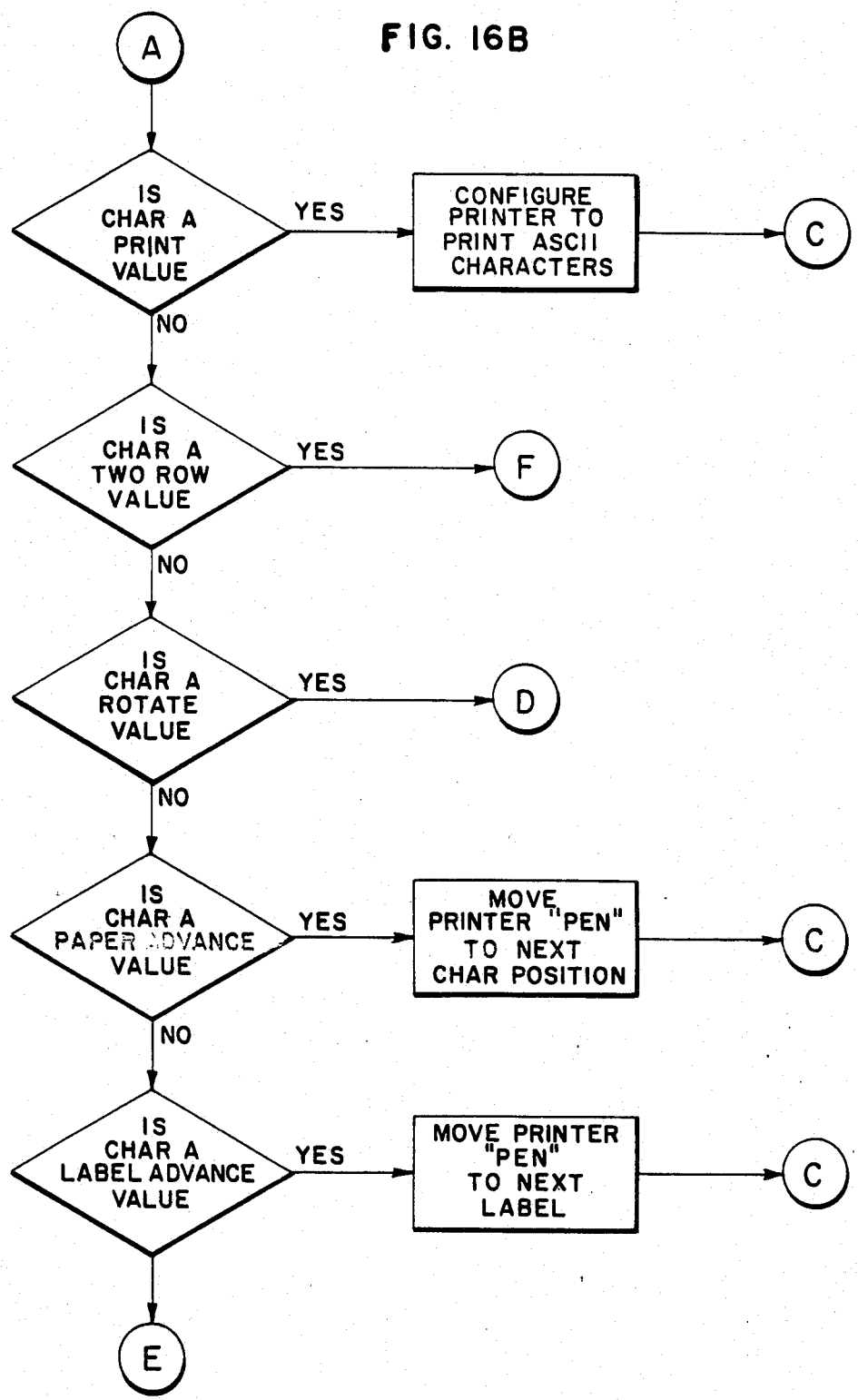
Figure 16E:
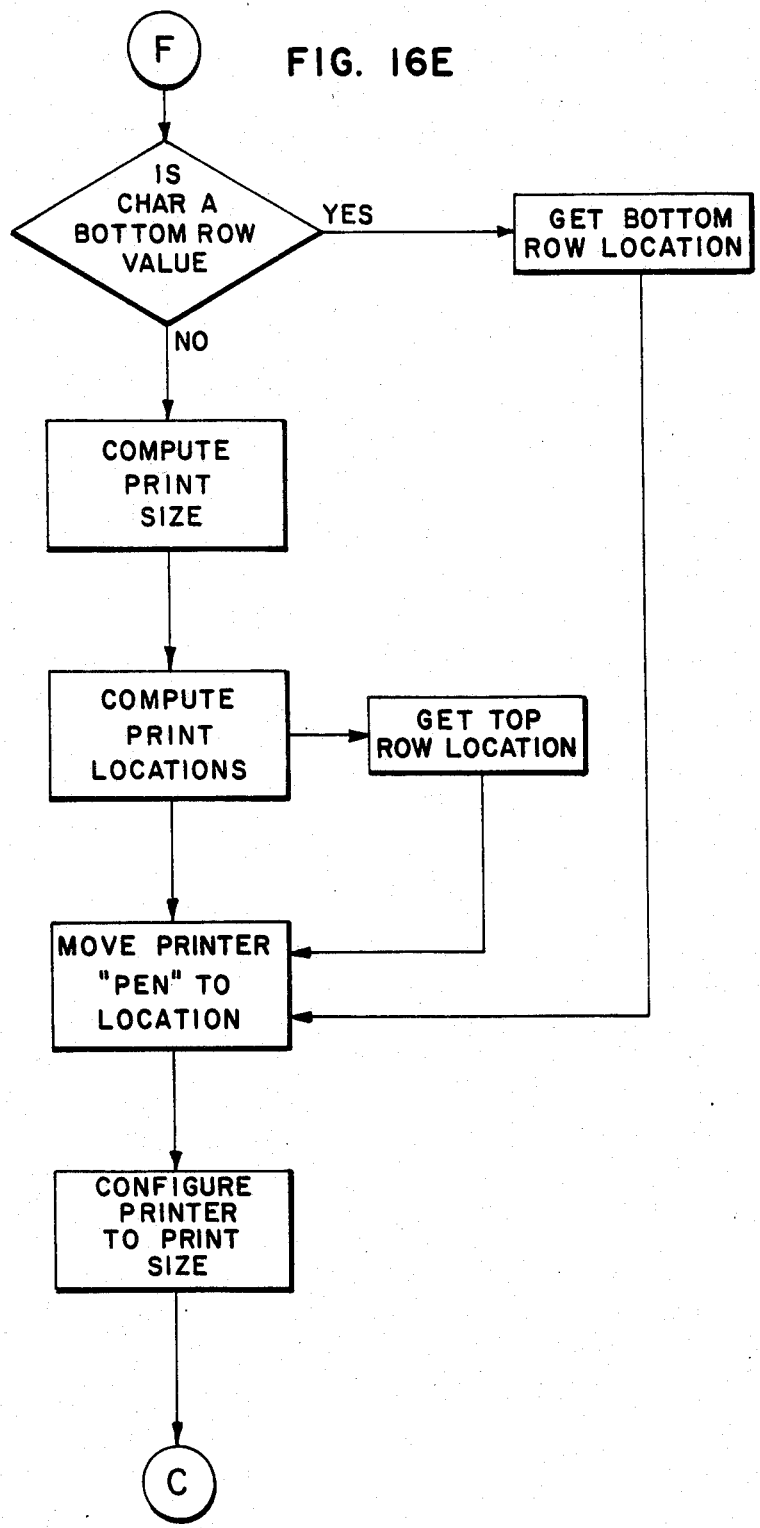
Figure 16F:
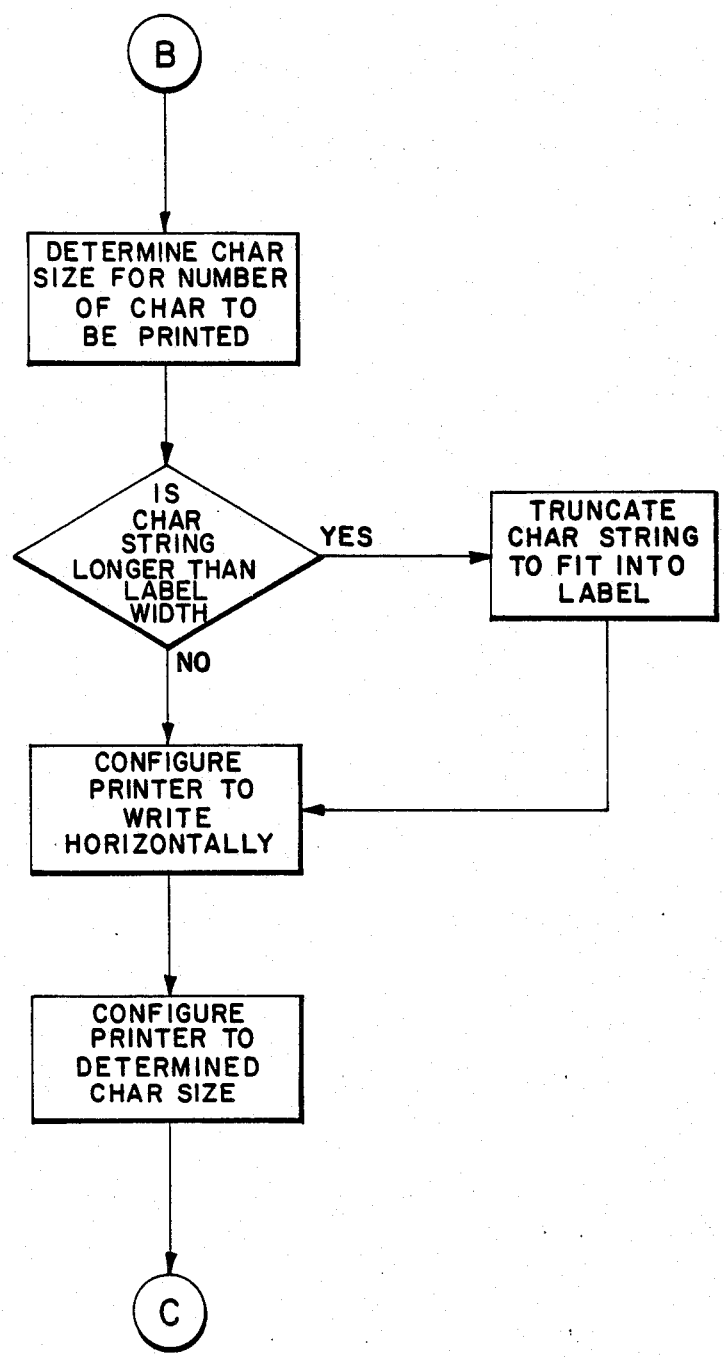

FIG. 15 illustrates the spool (SPOOL) subroutine. The spool subroutine places characters passed to it into the current available position in the spool buffer and points to the next available position and checks to see if the buffer is full. If the buffer is full, a buffer full flag is set, else it is cleared.

FIGS. 16A through 16F illustrate the printer control (PTRCTL) subroutine. The printer control subroutine determines the type of printing to do (e.g. two row, horizontal printing) and configures the X-Y plotter's character site and print orientation and transfers the characters from the spool buffer to the X-Y plotter. When an end of string is encountered, the X-Y plotter moves the pen to the next location.

Figure 17:
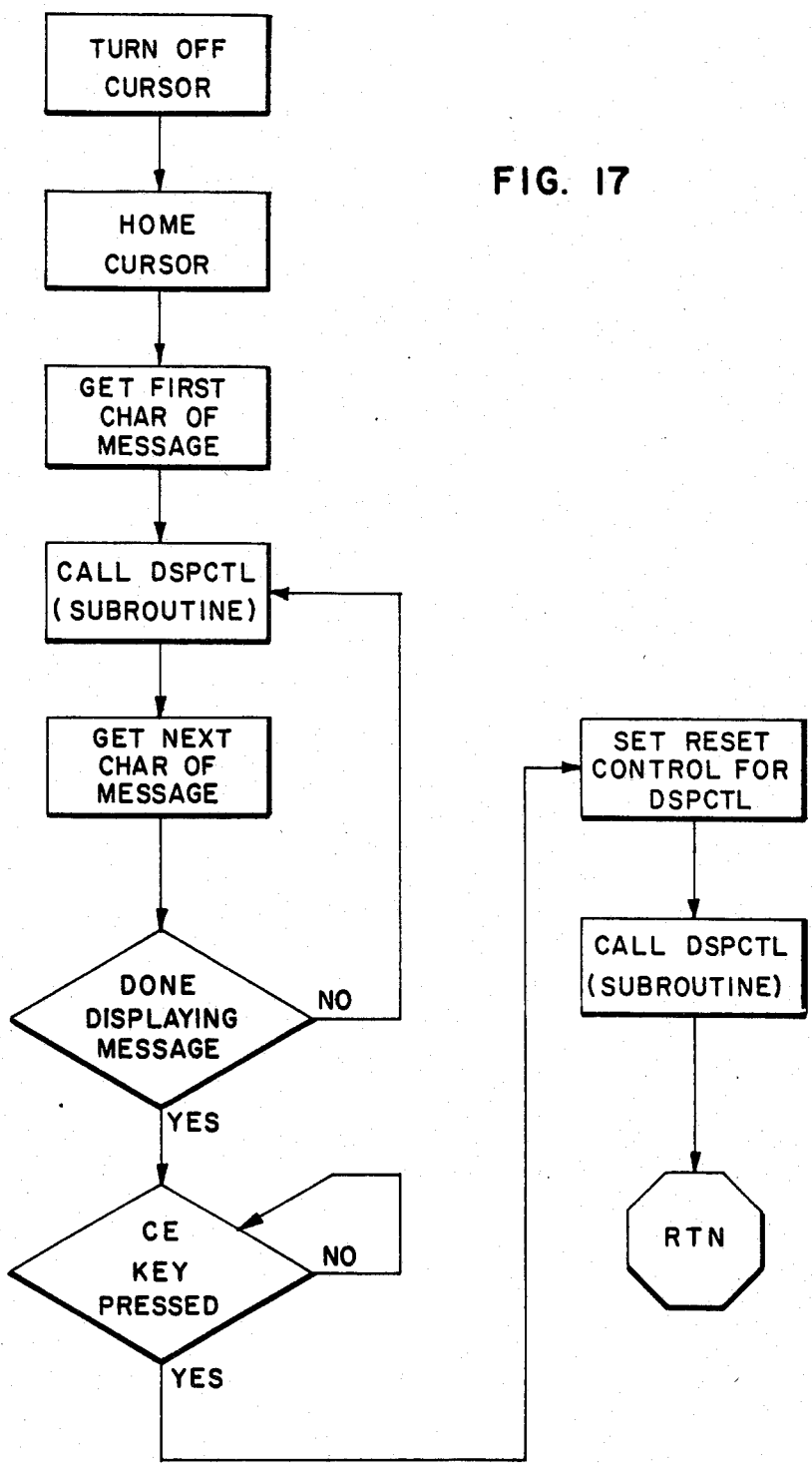
FIG. 17 is a logic flow diagram of the error subroutine of the embodiment shown in FIG. 1.

FIG. 17 illustrates the error (ERROR) subroutine. The error subroutine decodes the message code passed to it and displays the message until the CE key is pressed.

FIGS. 18A through 18B illustrate the display control (DSPCTL) subroutine. The display control subroutine writes characters to the display as they are passed from other routines. A reset command blanks the display and writes the two delimiters in the two leftmost positions. All other characters are written from left to right with a maximum of 14 characters. When more than 14 characters are entered, an error message is displayed.

It is to be understood that even though numerous characteristics and advantages of the invention have been set forth in the foregoing description, together with details of the structure and function of the invention, the disclosure is illustrative only, and changes may be made in detail, especially in matters of shape, size and arrangement of parts within the principles of the invention, to the full extent indicated by the broad general meaning of the terms in which the appended claims are expressed.

What is claimed is:

1. A hand held labeler apparatus, comprising:
   a. a housing having a front end portion and a back end portions, the housing further having a top portion, two spaced apart side portion, and a bottom portion, the bottom portion and the side portions being adapted for being engaged by a user's hand;
   b. label support means interconnected to and supported by the housing for supporting a composite web of label material releasably adhered to a backing strip of material, the composite web having a longitudinal axis and a transverse axis;
   c. power supply means positioned within and supported by the housing for providing electrical energy required to operate the labeler apparatus;
   d. printer means supported by the housing for printing on the label material at a printing position, the printer means including an X-Y plotter apparatus electrically interconnected to the power supply means, the X-Y plotter apparatus including marking means for applying indicia on the label material, the indicia being applied at the printing position on a side of the label material facing the user;
   e. drive means supported by the housing for advancing the composite web in a direction generally parallel to the longitudinal axis of the composite web past the printing position into printing relationship with the printer means, the drive means further including means for moving the marking means transversely of the composite web;
   f. keyboard supported on the top portion of the housing for entering user-selected label information to be printed on the label material by the printer means and for entering operational information for controlling operation of the keyboard and the printer means;
   g. display means supported by the housing displaying the selected information to be printed by the printer means; and
   h. control processor means supported by the housing and electronically interconnected to the keyboard for receiving and processing data representative of the user selected label information and operational information entered at the keyboard, the control means being electrically interconnected to the display means for transmitting to the display means data representative of the selected information to be displayed at the display means, the control means being further electrically interconnected to the printer means for transmitting to the printer means data representative of the user selected label information to be printed on the label material by the printer means, the control processor means being further electrically interconnected to the drive means for advancing the label material as required for printing.

2. A labeler apparatus in accordance with claim 1, wherein the display means in cooperation with the control processor means provides for display of certain status information representative of the operational status of the labeler apparatus.

3. A labeler apparatus in accordance with claim 1, wherein the label material includes a plurality of distinct adhesive-backed strips of labels releasably adhered to the backing strip of material, the distinct strips of label material extending generally longitudinally of the composite web.

4. A labeler apparatus in accordance with claim 1, wherein the label material includes distinct strips of label material mounted transversely of the longitudinal axis of the composite web, the control processor means providing for operator selection of the distinct strip of label material to be printed on.

5. A labeler apparatus in accordance with claim 1, wherein the XY plotter apparatus includes two stepping motor means, an X motor means for movement of the marker means in a direction generally parallel to the transverse axis of the composite web, and a Y motor means for movement of the composite web in a direction generally parallel to its longitudinal axis, the stepping motors being electrically interconnected to the control processor means.

6. A labeler apparatus in accordance with claim 5, wherein the marker means includes a removable cartridge pen for imparting recognizable indicia on the label material, the cartridge pen being substantially enclosed by the housing, the housing including a removable panel enabling access to the cartridge pen to enable replacement thereof.

7. A labeler apparatus in accordance with claim 1, wherein the control processor means includes memory for storing data representative of each character/symbol to be printed by the printer means.

8. A labeler apparatus in accordance with claim 1, wherein the control processor means includes means for automatically incrementing numeric characters by a predetermined amount.

9. A labeler apparatus in accordance with claim 1, wherein the control processor means includes means cooperating with the printer means for printing the selected information in varying sizes of characters.

10. A labeler apparatus in accordance with claim 9, wherein the control processor means includes means cooperating with the keyboard to enable a user to select a predetermined label length by entering specified operational information at the keyboard.

11. A labeler apparatus in accordance with claim 1, wherein the control processor means and the printer means cooperate to print the selected information on the label material in one of first and second directions, the first direction being substantially parallel to the longitudinal axis of the composite web, the second direction being substantially parallel to the transverse axis of the composite web, the control processor means and the keyboard cooperating to enable user selection of the first and second direction.

12. A labeler apparatus in accordance with claim 1, wherein the keyboard includes multiple function keys having more than one mode of entry, differing information being entered in each mode of operation, the mode of operation being user selectable.

13. A labeler apparatus in accordance with claim 1, wherein the housing includes means for receiving a source of electrical energy from an AC electrical power supply external to the housing.

14. A labeler apparatus in accordance with claim 1, wherein the control processor means and the printer means cooperate to provide for printing of multiple modes of selected information on the label material, the control processor means and the keyboard means cooperating to enable user selection of the number of rows to be printed.

15. A labeler apparatus in accordance with claim 1, wherein the XY plotter apparatus has a predetermined range of movement parallel to the transverse axis of the composite web.

16. A labeler apparatus in accordance with claim 1, wherein the label support means is enclosed within the housing, the housing including a removable panel to enable access to the label support means.

17. A labeler apparatus in accordance with claim 1, wherein the control processor means operates with the display means to display the user selected information entered at the keyboard prior to printing of the same on the label material, the control processor means cooperating with the keyboard to enable user activated printing of the selected information so displayed.

18. A labeler apparatus in accordance with claim 1, wherein the display means is disposed on the top portion of the housing and faces upwardly and towards the back end portion of the housing so as to be observable by the user during hand held operation.

19. A hand held labeler apparatus, comprising:
 a. a housing having a top portion, side portions and a bottom portion, the housing further having a front end portion and a back end portion, the top portion facing substantially upwardly and the back end portion facing toward the user when hand held by the user, the bottom and side portions being generally engaged by the user's hand when so hand held;
 b. a roll of labels interconnected to and supported by the front end portion of the housing, the roll of labels comprising label media releasably adhered to a backing strip of material, the label media having a longitudinal axis and a transverse axis;
 c. power supply means supported by the housing switchable between a DC battery power supply positioned within the housing and an external DC power supply for providing electrical power required to operate the labeler apparatus, the housing further including adaptor means for interconnecting to the DC power supply;
 d. printer means supported by the housing for printing on the label material at a printing position proximate the front end portion of the housing, the printer means printing on a side of the label material facing the back end portion of the housing so as to be observable by the user when the housing is hand held by the user, the printer means including an X-Y plotter apparatus electrically interconnected to the power supply, the X-Y plotter apparatus including a marker apparatus for marking on the label material, the X-Y plotter apparatus further including Y stepper motor means for incrementally advancing the label material in a direction substantially parallel to the longitudinal axis of the label material and X stepper motor means for incremental movement of the marker apparatus in a direction parallel to the transverse axis of the label material;

e. a keyboard supported on the top portion of the housing for entering user selected label information to be printed on the label material by the printer means and for entering operational information controlling operation of the keyboard and the printer means, the keyboard including multiple function keys having multiple modes of entry, each mode of entry providing for entry of different information, the modes of entry being user selectable by use of mode selection keys on the keyboard;

f. display means supported on the top portion of the housing intermediate the keyboard and the printing position for displaying user selected label information to be printed by the printer means, the display means facing upwardly and toward the back end portion when the housing is hand held by the operator, thereby enabling the operator to observe the display means when entering the use selected label information at the keyboard; and g. programmed control processor means positioned in the housing and electrically interconnected to the power supply, the keyboard, the printer means, and the display means, the control processor means receiving and processing data received from the keyboard means which is representative of the selected label information and operational information entered at the keyboard, the control means transmitting to the display means data representative of the selected label information to be displayed at the display means, control means transmitting to the printer means data representative of the selected label information to be printed on the label material by the printer means.

* * * * *